(12) United States Patent
Gerdes et al.

(10) Patent No.: US 12,158,548 B2
(45) Date of Patent: Dec. 3, 2024

(54) ACOUSTIC FINGERPRINTING

(71) Applicant: ORACLE INTERNATIONAL CORPORATION, Redwood Shores, CA (US)

(72) Inventors: Matthew T. Gerdes, Oakland, CA (US); Guang C. Wang, San Diego, CA (US); Timothy D. Cline, Gainesville, VA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/735,245

(22) Filed: May 3, 2022

(65) Prior Publication Data
US 2023/0358872 A1 Nov. 9, 2023

(51) Int. Cl.
*G01S 7/52* (2006.01)
*G01S 15/89* (2006.01)

(52) U.S. Cl.
CPC ...... *G01S 7/52001* (2013.01); *G01S 7/52004* (2013.01); *G01S 15/89* (2013.01)

(58) Field of Classification Search
CPC .......................................................... G01S 1/05
See application file for complete search history.

(56) References Cited

U.S. PATENT DOCUMENTS

| | | | |
|---|---|---|---|
| 3,705,516 A | 12/1972 | Reis | |
| 4,635,058 A * | 1/1987 | Sutphin, Jr. | G01S 13/86 342/52 |
| 4,686,655 A * | 8/1987 | Hyatt | G02F 1/13318 708/3 |

(Continued)

FOREIGN PATENT DOCUMENTS

| | | |
|---|---|---|
| CN | 107181543 A1 | 9/2017 |
| CN | 110941020 A1 | 3/2020 |

(Continued)

OTHER PUBLICATIONS

Maragos, Petros. "Morphological correlation and mean absolute error criteria." International Conference on Acoustics, Speech, and Signal Processing,. IEEE, 1989. (Year: 1989).*

(Continued)

*Primary Examiner* — Isam A Alsomiri
*Assistant Examiner* — Jonathan D Armstrong
(74) *Attorney, Agent, or Firm* — Kraguljac Law Group, LLC

(57) ABSTRACT

Systems, methods, and other embodiments associated with acoustic fingerprint identification of devices are described. In one embodiment, a method includes generating a target acoustic fingerprint from acoustic output of a target device. A similarity metric is generated that quantifies similarity of the target acoustic fingerprint to a reference acoustic fingerprint of a reference device. The similarity metric is compared to a threshold. In response to a first comparison result of the comparing of the similarity metric to the threshold, the target device is indicated to match the reference device. In response to a second comparison result of the comparing of the similarity metric to the threshold, it is indicated that the target device does not match the reference device.

20 Claims, 6 Drawing Sheets

(56) References Cited

U.S. PATENT DOCUMENTS

| | | | |
|---|---|---|---|
| 5,357,484 A * | 10/1994 | Bates | G01S 3/8036 367/129 |
| 5,619,616 A * | 4/1997 | Brady | G01H 3/08 706/20 |
| 5,684,718 A | 11/1997 | Jenkins et al. | |
| 7,020,802 B2 | 3/2006 | Gross et al. | |
| 7,191,096 B1 | 3/2007 | Gross et al. | |
| 7,281,112 B1 | 10/2007 | Gross et al. | |
| 7,292,659 B1 | 11/2007 | Gross et al. | |
| 7,391,835 B1 | 6/2008 | Gross et al. | |
| 7,542,995 B2 | 6/2009 | Thampy et al. | |
| 7,573,952 B1 | 8/2009 | Thampy et al. | |
| 7,613,576 B2 | 11/2009 | Gross et al. | |
| 7,613,580 B2 | 11/2009 | Gross et al. | |
| 7,703,325 B2 | 2/2010 | Wu | |
| 7,702,485 B2 | 4/2010 | Gross et al. | |
| 7,869,977 B2 | 1/2011 | Lewis et al. | |
| 8,055,594 B2 | 11/2011 | Dhanekula et al. | |
| 8,069,490 B2 | 11/2011 | Gross et al. | |
| 8,150,655 B2 | 4/2012 | Dhanekula et al. | |
| 8,200,991 B2 | 6/2012 | Vaidyanathan et al. | |
| 8,214,682 B2 | 7/2012 | Vaidyanathan et al. | |
| 8,275,738 B2 | 9/2012 | Gross et al. | |
| 8,341,759 B2 | 12/2012 | Gross et al. | |
| 8,365,003 B2 | 1/2013 | Gross et al. | |
| 8,452,586 B2 | 5/2013 | Master et al. | |
| 8,457,913 B2 | 6/2013 | Zwinger et al. | |
| 8,543,346 B2 | 9/2013 | Gross et al. | |
| 8,983,677 B2 * | 3/2015 | Wright | H04B 11/00 701/1 |
| 9,093,120 B2 | 7/2015 | Bilobrov | |
| 9,514,213 B2 | 12/2016 | Wood et al. | |
| 9,911,336 B2 | 3/2018 | Schlechter et al. | |
| 9,933,338 B2 | 4/2018 | Noda et al. | |
| 10,015,139 B2 | 7/2018 | Gross et al. | |
| 10,149,169 B1 | 12/2018 | Keller | |
| 10,452,510 B2 | 10/2019 | Gross et al. | |
| 10,496,084 B2 | 12/2019 | Li et al. | |
| 10,860,011 B2 | 12/2020 | Gross et al. | |
| 10,929,776 B2 | 2/2021 | Gross et al. | |
| 11,042,428 B2 | 6/2021 | Gross et al. | |
| 11,055,396 B2 | 7/2021 | Gross et al. | |
| 11,392,786 B2 | 7/2022 | Gross et al. | |
| 2001/0044719 A1 * | 11/2001 | Casey | G10L 15/02 704/E21.013 |
| 2003/0033094 A1 * | 2/2003 | Huang | G10L 19/0212 704/E19.02 |
| 2003/0061008 A1 * | 3/2003 | Smith, Jr. | G05B 23/0283 702/188 |
| 2004/0258154 A1 * | 12/2004 | Liu | H04N 19/56 375/E7.263 |
| 2007/0288242 A1 * | 12/2007 | Spengler | G10L 15/20 704/E15.04 |
| 2008/0140362 A1 | 6/2008 | Gross et al. | |
| 2008/0252309 A1 | 10/2008 | Gross et al. | |
| 2008/0252441 A1 | 10/2008 | McElfresh et al. | |
| 2008/0256398 A1 | 10/2008 | Gross et al. | |
| 2009/0099830 A1 | 4/2009 | Gross et al. | |
| 2009/0115635 A1 * | 5/2009 | Berger | G10L 25/51 340/943 |
| 2009/0125467 A1 | 5/2009 | Dhanekula et al. | |
| 2009/0306920 A1 | 12/2009 | Zwinger et al. | |
| 2010/0023282 A1 | 1/2010 | Lewis et al. | |
| 2010/0033386 A1 | 2/2010 | Lewis et al. | |
| 2010/0080086 A1 * | 4/2010 | Wright | H04K 3/45 367/191 |
| 2010/0161525 A1 | 6/2010 | Gross et al. | |
| 2010/0305892 A1 | 12/2010 | Gross et al. | |
| 2010/0306165 A1 | 12/2010 | Gross et al. | |
| 2012/0030775 A1 | 2/2012 | Gross et al. | |
| 2012/0111115 A1 | 5/2012 | Ume et al. | |
| 2012/0245978 A1 * | 9/2012 | Jain | G06Q 30/02 705/7.34 |
| 2013/0157683 A1 | 6/2013 | Lymberopoulos et al. | |
| 2013/0211662 A1 * | 8/2013 | Blumer | G06Q 50/30 701/1 |
| 2014/0354300 A1 | 12/2014 | Ramachandran et al. | |
| 2015/0137830 A1 | 5/2015 | Keller, III et al. | |
| 2016/0098561 A1 | 4/2016 | Keller et al. | |
| 2016/0258378 A1 | 9/2016 | Bizub et al. | |
| 2017/0163669 A1 | 6/2017 | Brown et al. | |
| 2017/0301207 A1 | 10/2017 | Davis et al. | |
| 2018/0011130 A1 | 1/2018 | Aguayo Gonzalez et al. | |
| 2018/0060203 A1 | 3/2018 | Gupta et al. | |
| 2018/0276044 A1 | 9/2018 | Fong et al. | |
| 2018/0349797 A1 | 12/2018 | Garvey et al. | |
| 2019/0041842 A1 * | 2/2019 | Cella | G05B 23/0264 |
| 2019/0064034 A1 | 2/2019 | Fayfield et al. | |
| 2019/0102718 A1 | 4/2019 | Agrawal | |
| 2019/0163719 A1 | 5/2019 | Gross et al. | |
| 2019/0196892 A1 | 6/2019 | Matei et al. | |
| 2019/0197145 A1 | 6/2019 | Gross et al. | |
| 2019/0237997 A1 | 8/2019 | Tsujii et al. | |
| 2019/0243799 A1 | 8/2019 | Gross et al. | |
| 2019/0286725 A1 | 9/2019 | Gawlick et al. | |
| 2019/0378022 A1 | 12/2019 | Wang et al. | |
| 2020/0125819 A1 | 4/2020 | Gross et al. | |
| 2020/0144204 A1 | 5/2020 | Keller, III et al. | |
| 2020/0191643 A1 | 6/2020 | Davis | |
| 2020/0201950 A1 | 6/2020 | Wang et al. | |
| 2020/0242471 A1 | 7/2020 | Busch | |
| 2020/0387753 A1 | 12/2020 | Brill et al. | |
| 2021/0081573 A1 | 3/2021 | Gross et al. | |
| 2021/0158202 A1 | 5/2021 | Backlawski et al. | |
| 2021/0174248 A1 | 6/2021 | Wetherbee et al. | |
| 2021/0270884 A1 | 9/2021 | Wetherbee et al. | |
| 2021/0406374 A1 * | 12/2021 | Wang | G06F 21/44 |
| 2022/0121955 A1 | 4/2022 | Chavoshi et al. | |
| 2022/0138358 A1 * | 5/2022 | Gerdes | G06F 21/57 726/34 |
| 2023/0054215 A1 | 2/2023 | Mishima et al. | |

FOREIGN PATENT DOCUMENTS

| | | | |
|---|---|---|---|
| DE | 4447288 A1 | 7/1995 | |
| DE | 60017609 T2 | 10/2005 | |
| DE | 102018207176 A1 | 11/2019 | |
| KR | 20210082971 A | 7/2021 | |
| WO | WO-2009046359 A2 * | 4/2009 | G01H 3/08 |
| WO | 2017187333 A1 | 11/2017 | |
| WO | 2020215116 A1 | 10/2020 | |
| WO | 2021166128 A1 | 8/2021 | |

OTHER PUBLICATIONS

Kenny Gross, Oracle Labs; MSET2 Overview: "Anomaly Detection and Prediction" Oracle Cloud Autonomous Prognostics; p. 1-58; Aug. 8, 2019.

Gross, K. C. et al., "Application of a Model-Based Fault Detection System to Nuclear Plant Signals," downloaded from https://www.researchgate.net/publication/236463759; Conference Paper: May 1, 1997, 5 pages.

Garcia-Martin Eva et al., "Estimation of Energy Consumption in Machine Learning," Journal of Parallel and Distributed Computing, Elsevier, Amsterdan, NL, vol. 134, Aug. 21, 2019 (Aug. 21, 2019), pp. 77-88.

Patent Cooperation Treaty (PCT), International Search Report and Written Opinion issued in PCT International Application No. PCT/US2020/060083 having a date of mailing of Mar. 19, 2021 (13 pgs).

Patent Cooperation Treaty (PCT), International Search Report and Written Opinion issued in PCT International Application No. PCT/US2021/015802 having a date of mailing of May 28, 2021 (13 pgs).

Patent Cooperation Treaty (PCT), International Search Report and Written Opinion issued in PCT International Application No. PCT/US2021/013633 having a date of mailing of May 6, 2021 (10 pgs).

Huang H, et al. "Electronic counterfeit detection based on the measurement of electromagnetic fingerprint," Microelectronics Reliability: an Internat . Journal & World Abstracting Service, vol. 55, No. 9, Jul. 9, 2015 (Jul. 9, 2015) pp. 2050-2054.

(56) References Cited

OTHER PUBLICATIONS

Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.
Patent Cooperation Treaty (PCT), International Search Report and Written Opinion issued in PCT International Application No. PCT/US2021/014106 having a date of mailing of Apr. 26, 2021 (9 pgs).
Patent Cooperation Treaty (PCT), International Search Report and Written Opinion issued in PCT International Application No. PCT/US2021/015359 having a date of mailing of Apr. 9, 2021 (34 pgs).
Gou, Yuhua, "Implementation of 3d Kiviat Diagrams." (2008). (Year: 2008).
Wang, Ray C., et al., Process Fault Detection Using Time-Explicit Kiviat Diagrams. AIChE Journal 61.12 (2015): 4277-4293.
Paulraj, et al; "Moving Vehicle Recognition and Classification Based on Time Domain Approach", Malaysian Technical Universities Conference on Engineering & Technology, MUCET 2012, Part 1—Electronic and Electrical Engineering, Procedia Engineering 53, pp. 405-410 (https:\\www.sciencedirect.com).
Seyerlehner, et al.: "Frame Level Audio Similarity—A Codebook Approach", Proc. of the 11th Int. Conference on Digital Audio Effects (DAFx-08), Espoo, Finland, Sep. 1-4, 2008, pp. 1-8.
Casey, et al.; "Audio Shingling for Measuring Musical Similarity", Purdue University—Engineering 2006 pp. 1-8.
US Patent and Trademark Office, Non-Final Office Action issued in U.S. Appl. No. 16/820,807 having a date of mailing of May 21, 2021.
Dickey et al.; Checking for Autocorrelation in Regression Residuals; pp. 959-965; Proceedings of 11th Annual SAS Users Group International Conference; 1986.
Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.
US Patent and Trademark Office, Non-Final Office Action issued in U.S. Appl. No. 16/804,531 having a date of mailing of Jul. 20, 2021.
Michael Kan; Does Your Motherboard Have a Secret Chinese Spy Chip?; Oct. 5, 2018, pp. 1-9, downloaded on Sep. 3, 21 from: https://www.pcmag.com/news/does-your-motherboard-have-a-secret-chinese-spy-chip.
Whisnant et al; "Proactive Fault Monitoring in Enterprise Servers", 2005 IEEE International Multiconference in Computer Science & Computer Engineering, Las Vegas, NV, Jun. 27-30, 2005.
U.S. Nuclear Regulatory Commission: "Technical Review of On-Lin Monitoring Techniques for Performance Assessment vol. 1: State-of-the-Art", XP055744715, Jan. 31, 2006, pp. 1-132.
Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.
Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.
Wald A, "Sequential Probability Ratio Test for Reliability Demonstration", John Wiley & Sons, 1947 (13 pgs).
Patent Cooperation Treaty (PCT), International Search Report and Written Opinion issued in PCT International Application No. PCT/US2021/062380 having a date of mailing of May 24, 2022 (10 pgs).
Yesilli et al.: "On Transfer Learning for Chatter Detection in Turning using Wavelet Packet Transform and Ensemble Empirical Mode Decomposition", CIRP Journal of Manufacturing Science and Technology, Elsevier, Amsterdam, NL, vol. 28, Dec. 30, 2019 (Dec. 30, 2019), pp. 118-135.
Abebe Diro et al.; A Comprehensive Study of Anomaly Detection Schemes in IoT Networks Using Machine Learning Algorithms; pp. 1-13; 2021; downloaded from: https://doi.org/10.3390/s21248320.
Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.
Choi Kukjin et al: "Deep Learning for Anomaly Detection in Time-Series Data: Review, Analysis, and Guidelines", IEEE Access, IEEE, USA, vol. 9, Aug. 26, 2021, (23 pgs).
Gross Kenny et al: "AI Decision Support Prognostics for IoT Asset Health Monitoring, Failure Prediction, Time to Failure", 2019 International Conference On Computational Science and Computational Intelligence (CSCI), IEEE, Dec. 5, 2019, pp. 244-248.

\* cited by examiner

ACOUSTIC FINGERPRINTING

BACKGROUND

Criminal organizations user small, fast boats, high-speed helicopters, and small airplanes to smuggle illicit cargo or persons into sovereign territories. It is not practicable to have human personnel visually monitoring thousands of miles of coastline or other territorial boundaries. The boats, helicopters, airplanes, and other vehicles involved in smuggling may be tracked by conventional radar surveillance. But, radar surveillance risks alerting the smuggler, who may change his behavior and prevent or avoid interdiction operations. Further, radar surveillance is unable to determine vehicle type or specifically identify individual vehicles.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
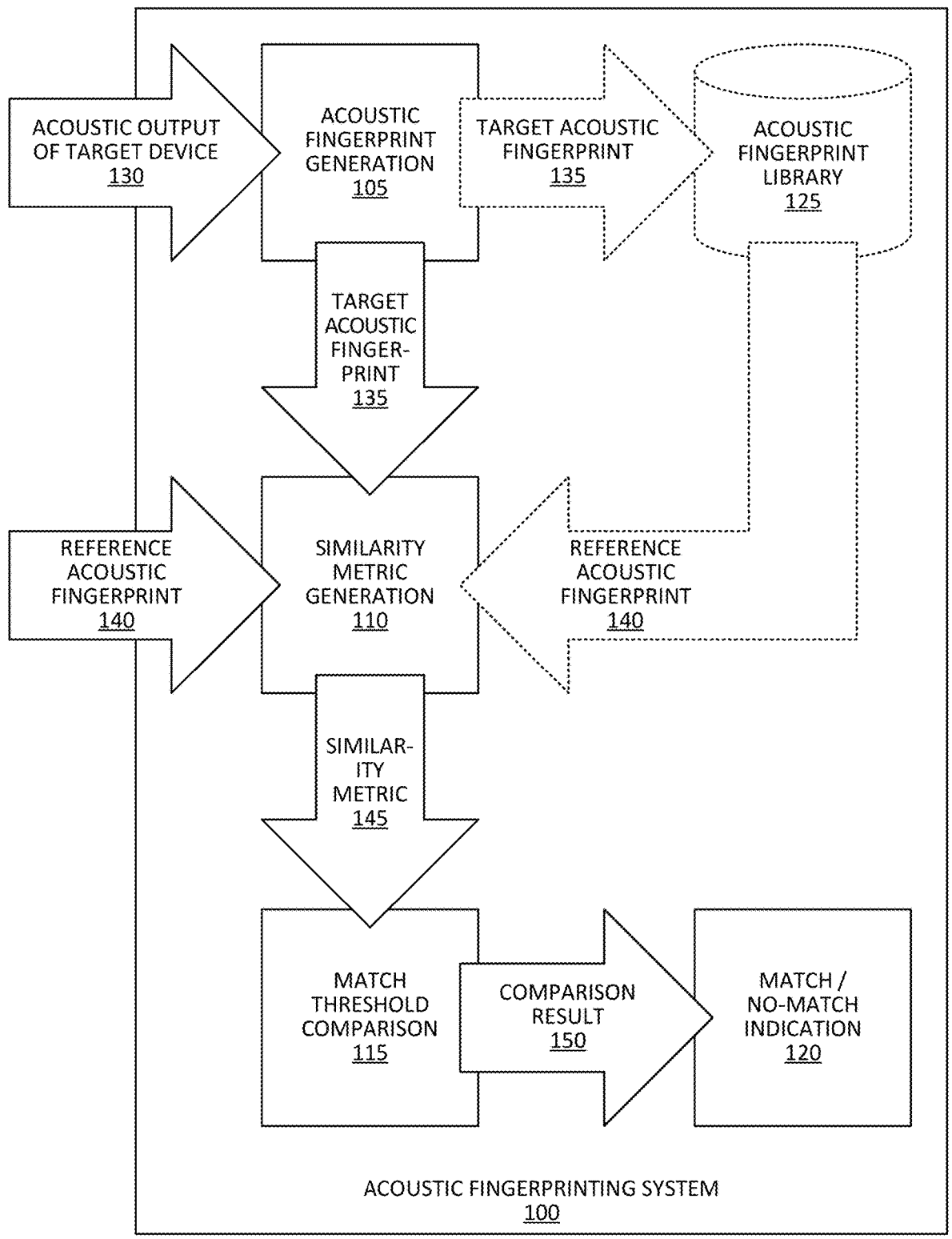
FIG. 1 illustrates one embodiment of an acoustic fingerprinting system associated with acoustic fingerprint identification of devices.

Systems, methods, and other embodiments are described herein that provide acoustic fingerprinting of a device to automatically identify the device based on sounds made by the device. In one embodiment, an acoustic fingerprinting system automatically extracts the most salient frequencies from the sounds made by the device to form an acoustic fingerprint, and determines how similar the acoustic fingerprint is to a reference. In one embodiment, based on the similarity, the acoustic fingerprinting system can state whether the device matches a known type or even identify the device as a specific individual.

Such acoustic fingerprint identification is highly useful, for example, in surveillance of vehicles such as boats used for smuggling or other illicit activities. For example, drug cartels and other criminal enterprises use small, fast "cigarette" boats, helicopters, and other aircraft that stay below standard radar surveillance to deliver illegal cargos. Use of radar or lasers to track these vehicles has a disadvantage of being active surveillance involving directing detectable energy at the target vehicle, alerting vehicle operators to the surveillance. Advantageously, acoustic fingerprint surveillance is passive, collecting sound wave vibrations emitted by operation of the target vehicle without the need to direct energy at the target. In one embodiment, acoustic fingerprinting may identify these vehicles tracked by sound.

In one embodiment, the acoustic fingerprinting system generates an acoustic fingerprint for a target device from measurements of acoustic (sound) output of the target device. A similarity metric is then generated. The similarity metric quantifies similarity of the acoustic fingerprint for the target device (also referred to as the target acoustic fingerprint) to another acoustic fingerprint for a reference device (also referred to as the reference acoustic fingerprint). The similarity metric is then compared to a threshold. In one embodiment, the threshold indicates a particular level of similarity between the target and reference acoustic fingerprints that distinguishes match and non-match between the target and reference acoustic fingerprints, and, by extension, between the target and reference devices. In response to a first result of the comparison of the similarity metric to the threshold, the acoustic fingerprinting system indicates that the target device matches the reference device. In response to a second result of the comparison of the similarity metric to the threshold, the acoustic fingerprinting system indicates that the target device does not match the reference device.

It should be understood that no action or function described or claimed herein is performed by the human mind, and cannot be practically performed in the human mind. An interpretation that any action or function described or claimed herein can be performed in the human mind is inconsistent with and contrary to this disclosure.

—Example Acoustic Fingerprinting System Overview—

FIG. 1 illustrates one embodiment of an acoustic fingerprinting system 100. Acoustic fingerprinting system 100 includes an acoustic fingerprint generation component 105 configured to generate acoustic fingerprints from input sound signals. Acoustic fingerprinting system 100 includes a similarity metric generation component 110 configured to generate a metric that characterizes or quantifies a similarity between two or more acoustic fingerprints. Acoustic fingerprinting system 100 includes a match threshold comparison component 115 configured to determine whether, based on a similarity metric, two acoustic fingerprints come from a same device, a device of similar type, make and/or configuration, or otherwise sufficiently similar device. Acoustic fingerprinting system 100 includes a match/no match indication component 120 that is configured to signal results of the comparisons between acoustic fingerprints. In one embodiment, acoustic fingerprinting system 100 may include an acoustic fingerprint library 125 configured to store acoustic fingerprints and associated data for subsequent reference. Each of the foregoing components and functions are described in further detail herein.

In one embodiment, acoustic fingerprint generation component 105 is configured to accept acoustic output of a device (such as acoustic output 130 of a target device) as an input. In one embodiment, the acoustic output 130 of the target device is sound wave amplitude-vs-frequencies emitted by operation of a device. The acoustic output is sensed by one or more acoustic transducers that convert the acoustic output to electrical signals representing the acoustic output. The electrical signals representing the acoustic output are provided as input for acoustic fingerprint generation. Thus, in one embodiment, the acoustic output 130 of the target device may be provided as electrical signals from one or more acoustic transducers detecting operation noises of the target device. These electrical signals may be provided live, in real-time, to acoustic fingerprint generation module 110 during surveillance of the target device. In one embodiment, these electrical signals may be pre-recorded, and provided to acoustic fingerprint generation module 110 following surveillance of the target device.

In one embodiment, the acoustic output 130 of the target device forms the basis of a target acoustic fingerprint 135 for the target device. In one embodiment, the acoustic fingerprint is an acoustic operation signature of a device, or a signature of the operational sounds of the device. Acoustic fingerprint generation module 105 may generate the target acoustic fingerprint 135 from the acoustic output 130. In one embodiment, the target acoustic fingerprint includes values sampled over time of selected frequencies within the broad-spectrum acoustic output 130 of the target device. In one embodiment, where the target device is to be compared to a particular reference acoustic fingerprint, the selected frequencies are those selected for inclusion in the reference acoustic fingerprint. The samples may be stored as time-series signals. In one embodiment, the target acoustic fingerprint includes a collection of time-series signals of samples from selected frequencies of the acoustic output 130 of the target device.

In one embodiment, the target acoustic fingerprint 135 generated for the target device is provided as an input to the similarity metric generation component 110. In one embodiment, the target acoustic fingerprint 135 is written to acoustic fingerprint library 125 for subsequent use. In one embodiment, a reference acoustic fingerprint 140 is also provided as an input to the similarity metric generation component 110. In one embodiment, the reference acoustic fingerprint 140 is generated by acoustic fingerprint generation module. In one embodiment, the reference acoustic fingerprint 140 is retrieved from acoustic fingerprint library 125, or from other storage locations.

In one embodiment, similarity metric generation component 110 generates a similarity metric 145 that expresses the extent of similarity or difference between the target acoustic fingerprint 135 and reference acoustic fingerprint 140. In one embodiment, the similarity metric generation component 110 compares the target acoustic fingerprint 135 to the reference acoustic fingerprint 140. The similarity metric generation component 110 to determines an extent to which the target acoustic fingerprint 135 and reference acoustic fingerprint 140 are similar, and/or an extent to which the target acoustic fingerprint 135 and reference acoustic fingerprint 140 differ. In one embodiment, similarity metric 145 is a value that characterizes the extent of similarity or difference.

In one embodiment, the value of the similarity metric 145 is compared to a threshold that indicates whether the target acoustic fingerprint 135 and the reference acoustic fingerprint 140 are a match. In one embodiment, the similarity metric 145 is provided as an input to match threshold comparison component 115. In one embodiment, a pre-determined match threshold is provided as an input to match threshold comparison component 115. In one embodiment, the match threshold indicates a level of similarity beyond which the target acoustic fingerprint and reference acoustic fingerprint are considered to match each other. The threshold may vary based on whether the desired level of match is a less restrictive match of device type, such as make and model, or a unique match with a particular individual device. In one embodiment, the match threshold comparison component 115 produces a comparison result 150 that indicates a match or no-match between the acoustic fingerprints.

In one embodiment, the comparison result 150 is provided to match/no match indication component 120. In one embodiment, match/no match indication component 120 generates a signal indicating whether the target device is or is not a match to the reference device based on the comparison result 150. This signal may be sent to other components or client systems of acoustic fingerprinting system 100. In one embodiment, match/no match indication component 120 is a user interface, such as a graphical user interface configured to present an alert to a user of acoustic fingerprinting system 100. In one embodiment, the alert indicates whether the target device is or is not a match to the reference device based on the comparison result 150.

Further details regarding acoustic fingerprinting system 100 are presented herein. In one embodiment, the operation of the acoustic fingerprinting system of FIG. 1 will be described with reference to an example method shown in FIG. 2. In one embodiment, generation of an acoustic fingerprint will be described with respect to an example spectrogram shown in FIG. 3. In one embodiment, identification of one or more target devices by acoustic fingerprint will be described with respect to an example method shown in FIG. 4. In one embodiment, differentiation between multiple target devices by acoustic fingerprint will be described with respect to an example similarity metric bar chart shown in FIG. 5.

—Example Method for Acoustic Fingerprint Identification of a Device—

Figure 2:
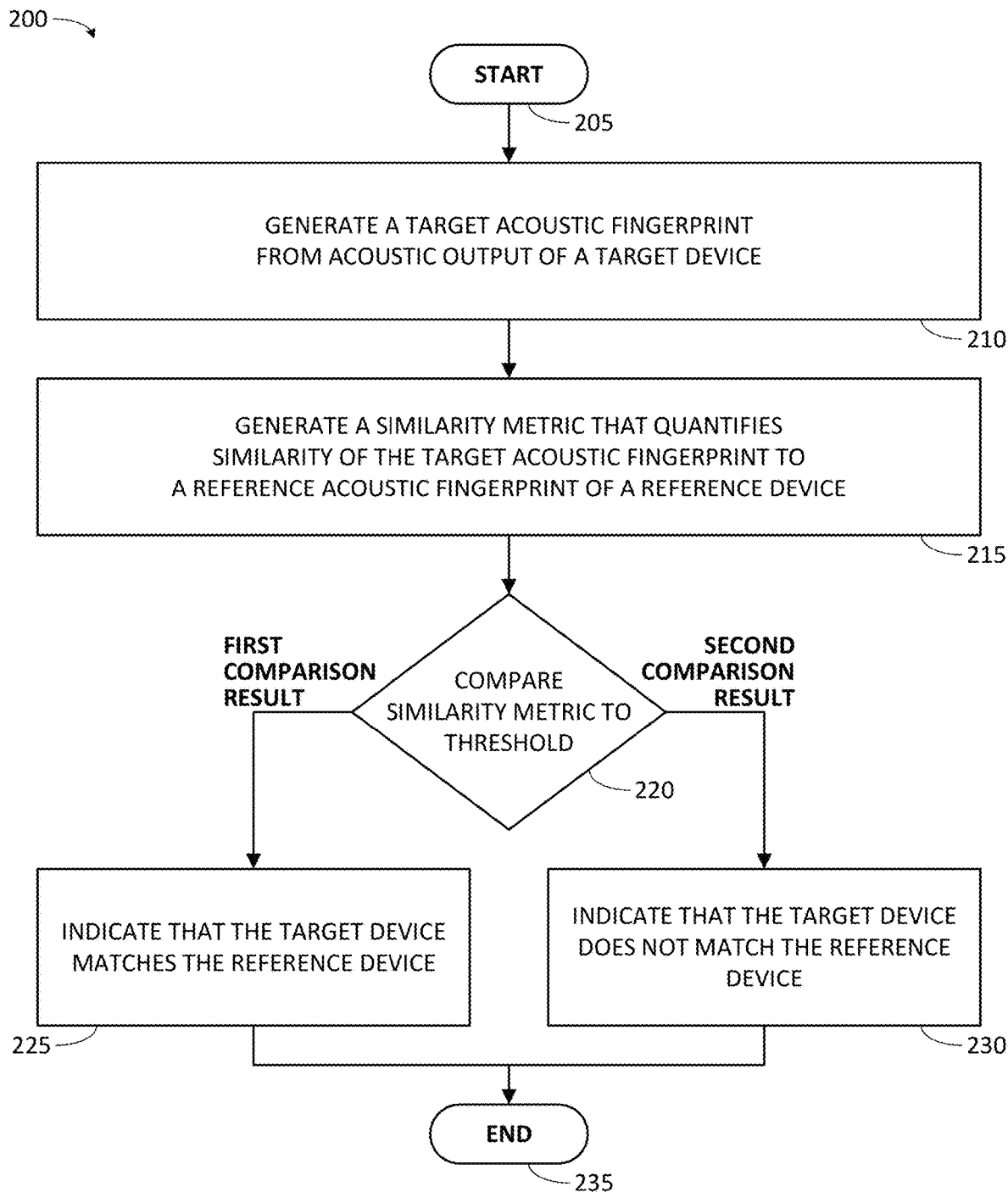
FIG. 2 illustrates one embodiment of an acoustic fingerprinting method associated with acoustic identification of a target device.

FIG. 2 illustrates one embodiment of an acoustic fingerprinting method 200 associated with acoustic identification of a target device. At a high level, in one embodiment, acoustic fingerprinting method 200 is a method for determining whether a target device matches a reference device based on similarity between acoustic fingerprints of the target and reference devices.

As an overview, in one embodiment, the acoustic fingerprinting method 200 generates an acoustic fingerprint for the target (also referred to as a target acoustic fingerprint). The target acoustic fingerprint provides a signature of sounds made by the target device during operation. The acoustic fingerprinting method 200 then generates a similarity metric that quantifies similarity between the target acoustic fingerprint and a reference acoustic fingerprint. The reference acoustic fingerprint provides a signature of sounds made by a reference device during operation. The similarity metric provides a value that indicates an extent to which the target and reference acoustic fingerprints resemble each other or differ from each other. The acoustic fingerprinting method 200 then compares the similarity metric to a threshold. The threshold may be a pre-determined threshold indicating an amount of similarity that distinguishes between a match or non-match of the fingerprints. By extension, match between the target and reference acoustic fingerprints indicates match between the target and reference devices. Accordingly, in response to the comparison result between the target and reference acoustic fingerprints, the acoustic fingerprinting method 200 indicates that the target device either matches, or does not match, the reference device.

In one embodiment, the acoustic fingerprinting method 200 initiates at start block 205 in response to a processor (such as a processor of acoustic fingerprinting system 100) determining one or more of: (i) a computer configured as or as part of an acoustic fingerprinting system (such as system 100) has received or has begun receiving acoustic output of a target device; (ii) acoustic surveillance of a target device has commenced or has completed; (iii) a user (or administrator) of an acoustic fingerprinting system (such as system 100) has initiated method 200; or (iv) that method 200 should commence in response to occurrence of some other condition. Method 200 continues to process block 210.

At process block 210, the processor generates a target acoustic fingerprint from acoustic output of a target device. In one embodiment, an acoustic fingerprint is a signature that characterizes sound produced during the operation of a device. In one embodiment, this fingerprint or signature includes acoustic information that is specific to the operation of a specific device, such as acoustic components of engine noise. Such an acoustic fingerprint may be used to uniquely identify a device. Therefore, in one embodiment, the target acoustic fingerprint is generated from the acoustic output of the target device to be an acoustic operation signature that is specific to the target device.

In one embodiment, to generate the acoustic fingerprint, the processor performs a bivariate frequency-domain to time-domain transformation of the fine frequency amplitude information in the acoustic output of the target device. The processor then forms the acoustic fingerprint from time series signals of amplitude values in selected frequency ranges.

In one embodiment, to effect the frequency-domain to time-domain transformation, the processor divides or groups the fine frequencies of the acoustic output into coarse frequency bins. In one embodiment, the range of fine frequency signals in a coarse frequency bin are represented by a representative signal for the frequency bin.

The processor then selects a set of one or more of the frequency bins for sequential sampling to create time series signals. In one embodiment, where the acoustic fingerprint is an acoustic fingerprint for a target device, the set of frequency bins selected for sampling are those that are most salient—that is, most information bearing—about the operation of a reference device to which the target device is to be compared. For example, the target acoustic fingerprint may be generated to include a set of component time series signals sampled from a set of frequencies that have highest power spectral density peaks among frequencies of reference acoustic output of a reference device.

In one embodiment, the processor creates a time series signal (TSS) for each frequency bin in the set to create a TSS for the frequency bin. In one embodiment, the processor creates a set of component TSSs by sampling representative frequencies of the set of bins to extract their amplitude values at intervals over a period of time. In one embodiment, a sample is taken from a bin or representative frequency of the bin by retrieving the value of the representative frequency at a specified point in time, such as on the interval. In one embodiment, the processor samples the amplitude of the representative signal of each frequency bin at intervals to generate signal values of the TSS for the frequency bin. In one embodiment, the sampling rate for the TSS may be lower than the sampling rate of the representative frequency. The processor uses the TSSs as component signals of the acoustic fingerprint.

Process block 210 then completes, and method 200 continues at process block 215. At the completion of process block 210, the processor has generated a target acoustic fingerprint that describes or characterizes operational acoustic output of a target device. This target acoustic fingerprint may be compared with a reference acoustic fingerprint to identify the target device. Further details regarding generation of a target acoustic fingerprint from acoustic output of a target device are described elsewhere herein.

At process block 215, the processor generates a similarity metric that quantifies similarity of the target acoustic fingerprint to a reference acoustic fingerprint of a reference device. In this way, the target acoustic fingerprint may be compared to the reference acoustic fingerprint to determine how similar or different the acoustic fingerprints are from one another. The similarity metric is a value that quantifies the results of the comparison between target and reference acoustic fingerprints. The similarity metric thus describes similarity of the acoustic fingerprints, and by extension, the similarity of the target and reference devices. The similarity metric may be used as a basis for determining whether or not the target and reference devices match.

In one embodiment, the corresponding component TSSs of target and reference acoustic fingerprints are compared. In this comparison, signal values of the corresponding component TSSs are compared pairwise to find an absolute error between each pair. The mean of the absolute error for the values of the corresponding component TSSs is then calculated to find a mean absolute error (MAE) between the component TSSs. The MAE quantifies similarity or likeness of the target and reference acoustic fingerprint in the frequency range represented by the corresponding component TSSs.

In one embodiment, this process of finding the MAE is performed for more than one pair of corresponding component TSSs between the target and reference acoustic fingerprints. For example, this process of finding the MAE may be performed for each pair of corresponding component TSSs between the target and reference acoustic fingerprints. The processor then finds a cumulative MAE (CMAE) between the target and reference acoustic fingerprints by finding the sum of the MAEs. The CMAE combines the MAEs between corresponding component TSSs to produce a single similarity metric that quantifies overall similarity or likeness of the target and reference acoustic fingerprints.

With the generation of the CMAE similarity metric, process block 215 completes, and method 200 continues at decision block 220. At the completion of process block 215, the complex question of the extent to which acoustic output of a target device resembles acoustic output of a reference device has been characterized or quantified in a simple similarity metric. The values of the similarity metric for target and reference acoustic fingerprints may be used to determine whether the target and reference devices match.

At decision block 220, the processor compares the similarity metric to a threshold. In one embodiment, the threshold describes a level of similarity between a target and reference acoustic fingerprint that distinguishes between a match and non-match. The threshold level may differ based on how similar the acoustic output of a devices should be for them to be considered matches. The threshold level may also be governed or dictated by the nature of the match. For example, a match of a target device to a make and model may have a relatively less restrictive threshold. Or, for example, a match of a target device to a particular individual device may have a relatively more restrictive threshold. In one embodiment, where a lower similarity metric value represents greater similarity (such as may be the case where the similarity metric is the CMAE), a relatively smaller or lower threshold is more restrictive than a relatively larger or higher threshold.

In one embodiment, the processor evaluates whether or not the value of the similarity metric satisfies the threshold. In one comparison result, the similarity metric satisfies the threshold. For example, the value of the CMAE between the target and reference acoustic fingerprints may be less than or equal to the threshold. In another comparison result, the similarity metric does not satisfy the threshold. For example, the value of the CMAE between the target and reference acoustic fingerprints may be greater than the threshold.

Once the processor has determined whether or not the similarity metric satisfies the threshold, decision block 220 then completes. In response to the first comparison result, method 200 continues at process block 225. In response to the second comparison result, method 200 continues at process block 230. At the completion of decision block 220, the processor has determined whether the target acoustic fingerprint is sufficiently like the reference acoustic fingerprint to be considered a match.

At process block 225, in response to a first comparison result (of the comparing of the similarity metric to the threshold) where the similarity metric satisfies the threshold, the processor indicates that the target device matches the reference device. In one embodiment, the processor composes and sends an electronic message indicating that the target device is a match to the reference device. In one embodiment, the processor causes a graphical user interface to display information indicating that the target device is a match to the reference device. Process block 225 then completes, and method 200 continues to END block 235, where method 300 completes.

At process block 230, in response to a second comparison result (of the comparing of the similarity metric to the threshold) where the similarity metric does not satisfy the threshold, the processor indicates that the target device does not the reference device. In one embodiment, the processor composes and sends an electronic message indicating that the target device is not a match to the reference device. In one embodiment, the processor causes a graphical user interface to display information indicating that the target device does not match the reference device. Process block 225 then completes, and method 200 continues to END block 235, where method 300 completes.

In one embodiment, as discussed in further detail elsewhere herein, the target device is either found to be the reference device itself, or found not to be the reference device, based on the comparison of the similarity metric and threshold. Thus, in one embodiment, in response to a comparison result that indicates finding the match, the processor indicates that the target device is the reference device. And, in one embodiment, in response to a comparison result that indicates not finding the match, the processor indicates that the target device is not the reference device.

In one embodiment, as discussed in further detail elsewhere herein, the target device is either found to be of a same type as the reference device, or found not to be of a same type as the reference device, based on the comparison of the similarity metric and threshold. Thus, in one embodiment, in response to a comparison result that indicates finding the match, the processor indicates that the target device is a same type of device as the reference device. And, in one embodiment, in response to a comparison result that indicates not finding the match, the processor indicates that the target device is a different type of device from the reference device.

In one embodiment, as discussed in further detail elsewhere herein, acoustic fingerprints are generated for target devices or reference devices. In one embodiment, to generate an acoustic fingerprint, acoustic output of a device is measured. In one embodiment, a spectrum of the measurements is decomposed into a set of frequencies. In one embodiment, the set of frequencies is partitioned into bins covering ranges of the set of frequencies. A set of one or more bins is selected to be a basis of the acoustic fingerprint. Representative frequencies of the set of bins are selected as component frequencies are sampled at intervals over a period of time to produce a set of component time series signals. Where the device is the target device, the target acoustic fingerprint is generated from the set of component time series signals. Where the device is the reference device, the reference acoustic fingerprint is generated from the set of component time series signals. In one embodiment, ambient noise in the component time series signals is compensated for based on values for the component time series signals predicted by a machine learning algorithm.

In one embodiment, as discussed in further detail elsewhere herein, similarity metrics are generated from differences between component signals of a target acoustic fingerprint and corresponding component signals in a reference acoustic fingerprint. In one embodiment, to generate the similarity metric, the processor finds a mean absolute error between a target component signal of a target acoustic fingerprint and a corresponding reference component signal of the reference acoustic fingerprint. In one embodiment, this mean absolute error detection may be repeated for a set of one or more target component signals included in the target acoustic fingerprint. Once the mean absolute errors are found for the target component signals in the set, the processor finds a sum of the mean absolute errors. In one embodiment, the similarity metric is the sum of the mean absolute errors. The sum of the mean absolute errors may be referred to as the cumulative mean absolute error (CMAE).

In one embodiment, as discussed in further detail elsewhere herein, the reference acoustic fingerprint is generated from measurements of acoustic output of the reference device. In one embodiment, as discussed in further detail elsewhere herein, the reference acoustic fingerprint is retrieved from a library of one or more acoustic fingerprints. In one embodiment, the reference acoustic fingerprint is stored in the library in association with information describing the reference device.

In one embodiment, as discussed in further detail elsewhere herein, the acoustic output of the target device is recorded passively, and recorded using one or more acoustic transducers.

In one embodiment, as discussed in further detail elsewhere herein, the target device is identified from among a plurality of devices. Here, measurements of acoustic output of the target device include measurements from the plurality of devices.

In one embodiment, as discussed in further detail elsewhere herein, the target device is a vehicle. In one embodiment, as discussed in further detail elsewhere herein, the vehicle is one of a watercraft or an aircraft.

—Example Acoustic Fingerprint Generation—

In one embodiment, the acoustic fingerprinting systems and methods described herein leverage acoustic resonance spectrometry (ARS) to identify devices such as vehicles based on acoustic output of the device during operation. In one embodiment, measured or observed broad-spectrum acoustic output of a device undergoes a novel bivariate frequency-domain to time-domain transformation that characterizes the acoustic output by separating it into bins of frequency ranges. From this characterized acoustic output, the top frequency representatives that best characterize the operation signature of the device are automatically identified and used to form an acoustic fingerprint of that device. Thus, in one embodiment, the acoustic fingerprinting systems and methods described herein transform an acoustic waveform (for example, from a directional microphone) into multiple time-series signals included in an acoustic fingerprint. In one embodiment, this acoustic fingerprint may allow signals from passive acoustic transducers or sensors (such as microphones) to be consumed and analyzed in real-time for rapid, early, and accurate device identification.

As used herein with respect to items being surveilled by the acoustic fingerprinting system, a device is a mechanical system being operated with one or more engines or motors. During operation, the engines or motors emit (or cause the device to emit) acoustic output. The acoustic output may be dynamic or changing in intensity, or vary as to frequency of repetition, based on speed of operation of the engine or motor.

In one embodiment, an acoustic fingerprint as described herein characterizes a frequency domain signature of operation of a device in the time domain by autonomously extracting selected most salient or informative time series signals from measured acoustic output of the device. In one embodiment, acoustic fingerprint generation component 105 is configured to identify and select the most salient frequencies for sampling as time series signals. In one embodiment, the time series signals for the one or more selected frequencies are used as the component frequencies of an acoustic fingerprint for the device.

Advantageously, in one embodiment, the acoustic fingerprints as described herein are compact because they rely on relatively few time series signals to accurately characterize operation of the device. Further, in one embodiment, due to the selection of a few most salient time series signals, the sampling rate of the time series signals may be relatively low with little loss of discriminative power of the fingerprint. In one embodiment, one or both of these characteristics of the acoustic fingerprint as shown and described herein enable low-overhead compute cost for acoustically identifying devices. This improvement is not due to application of brute force computing power.

Figure 3:
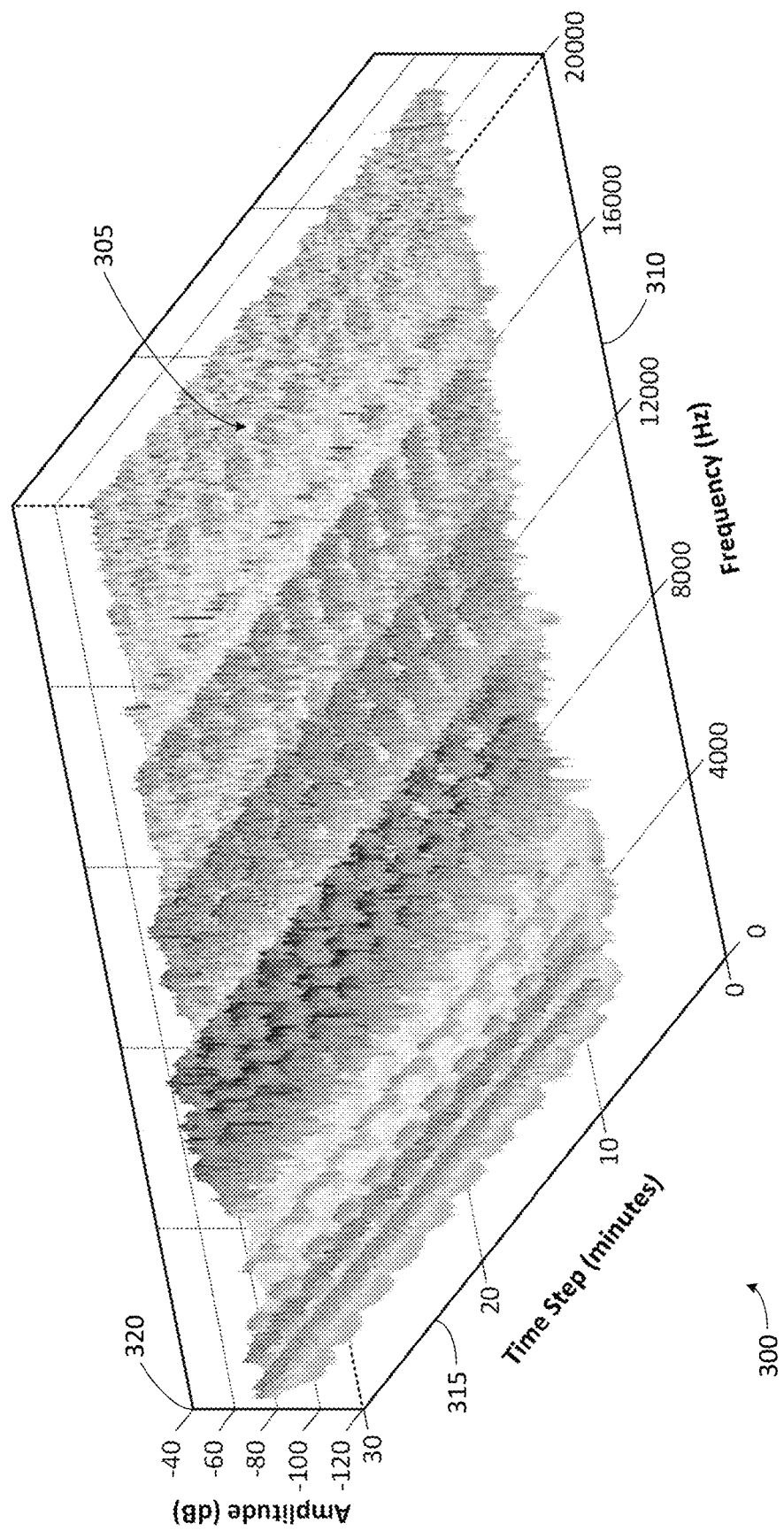
FIG. 3 illustrates a waveform plot against three axes of example measurements obtained from acoustic sensors monitoring a target device.

In one embodiment, to generate an acoustic fingerprint from acoustic output of a device, the acoustic output of a device is first detected, sensed, or measured. In one embodiment, this detection, sensing, or measurement may be performed by acoustic transducers and a spectrum analyzer. FIG. 3 illustrates a waveform plot 300 against three axes of example measurements 305 obtained from acoustic sensors monitoring a target device (in this example, a boat). The frequency is on the x-axis 310, time on the y-axis 315, and the acoustic power amplitude on the z-axis 320. Example measurements 305 shows how the acoustic output (or response, measured in power on z-axis 320) at each frequency changes over time. In one embodiment, the frequency domain waveforms over the spectrum of frequencies are sampled at a high sampling rate, such as 20 kHz.

The measurements cover a spectrum of frequencies. For example, the measurements may cover a spectrum of frequencies detectable by the acoustic transducers. In one embodiment, as shown in plot 300, the spectrum of frequencies approximately covers the range of human hearing, for example from 20 Hz to 20,000 Hz. In one embodiment, the spectrum of frequencies may extend below the range of human hearing into infrasound frequencies. In one embodiment, the spectrum of frequencies may extend above the range of human hearing into ultrasound frequencies.

In one embodiment, the acoustic output of a target device is analyzed by a spectrum analyzer. The spectrum analyzer takes the raw electronic signals from acoustic transducers sensing the acoustic output and converts the electronic signals into a computer-readable representation of the acoustic output. The acoustic output is presented to the acoustic fingerprinting system in the frequency domain. The acoustic output is represented over a frequency spectrum at a fine frequency resolution pre-selected for the spectrum analyzer.

In one embodiment, the acoustic output is in the frequency domain. In one embodiment, the acoustic output is a continuous frequency waveform spectrum output by acoustic transducers. For example, the acoustic output detected by the acoustic transducers may be a sequence sampled at time intervals of frequency-domain waveforms over the spectrum of frequencies. The acoustic fingerprinting system then effects a frequency-domain to time-domain transformation to turn the acoustic waveforms into time series signals of operational signatures to be used as components to create an acoustic fingerprint.

As an initial step of the frequency-domain to time-domain transformation, the spectrum of frequency-domain measurements over time is then decomposed into a set of raw frequencies. In one embodiment, the set of frequencies includes a frequency at intervals along the frequency spectrum. In one embodiment, the frequencies are at intervals of the raw (fine frequency resolution) output by the spectrum analyzer, or coarser intervals.

In one embodiment, as a next step of the frequency-domain to time-domain transformation, the set of frequencies is then partitioned into bins covering ranges of the set of frequencies. Thus, in one embodiment, the spectrum is divided into discrete bins that do not overlap. For example, processor divides the frequency spectrum of the acoustic output into frequency bins. In one embodiment, the frequency bins are contiguous ranges of the frequency spectrum. In one embodiment, the bins are of approximately equal width, covering similar range intervals of the frequency spectrum.

In one embodiment, a frequency bin is represented by a discrete signal of acoustic amplitude over time within the frequency range of the bin. This signal may be referred to as the representative signal for the frequency bin. In one embodiment, the representative signal for the frequency bin may be a single selected frequency within the bin. For example, the representative signal may be the frequency signal among those within the bin that has highest peaks or that has greatest changes in amplitude. In another example, the representative signal may be a frequency signal at a selected location within the frequency range of the frequency bin, such as at a mid-point of the range. In one embodiment, the representative signal may be an aggregate signal. For example, the aggregate signal may be an average (mean or median) of fine frequency values across the frequency range of the frequency bin.

The frequency bins and their representative signals may be considered to be "coarse" because multiple raw frequencies are included in a frequency bin. For example, in one embodiment, the frequency spectrum may be divided into 100 bins (although higher or lower numbers of bins may be used). Thus, in an acoustic spectrum ranging from 20 Hz to 20,000 Hz, a frequency bin that is one one-hundredth (0.01) of the width of the spectrum is approximately 200 (199.8) Hz wide. Referring again to FIG. 3, the original acoustic waveform of example measurements 305 is shown binned into 100 independent bins.

In a further step of the frequency-domain to time-domain transformation, a set of one or more bins is selected to be a basis of the acoustic fingerprint. In one embodiment, the selection of these bins is performed automatically by the acoustic fingerprinting system. In one embodiment, where the acoustic fingerprint being constructed is a reference fingerprint, the selected bins are the most salient, or those that carry the most information about the operation of the reference device.

In one embodiment, the target acoustic fingerprint is specifically generated for the purpose of comparison with a specific reference fingerprint, and therefore includes samples of acoustic output of the target at frequency ranges also sampled for acoustic output of the reference device. In one embodiment, where the acoustic fingerprint being created is a target acoustic fingerprint, the selected bins are those bins used to create the reference acoustic fingerprint that the target acoustic fingerprint is to be compared to. In this way, the target acoustic fingerprint includes content most salient for comparison with the reference acoustic fingerprint.

For example, the acoustic fingerprinting system selects representative frequencies for a plurality of the bins that have the highest power spectral density peaks to be included in the set of frequencies for the target acoustic fingerprint.

In one embodiment, the most salient representative signals may be autonomously extracted and ranked by the acoustic fingerprinting system based on a power spectral density (PSD) analysis of the representative signals. In one embodiment, a PSD curve is generated for each representative frequency. Peaks in the PSD curve are dominated by repetitive or cyclic output, such as motor/engine or other drive-train noise of the device under acoustic surveillance. Thus, the motor, engine, drivetrain, or other cyclic noises made by operating the device appear as peaks in the PSD curves. Those representative frequencies having the highest peaks in the PSD curve thus carry the most information—sounds produced by operation of the device—and are therefore the most salient.

In one embodiment, the bins are ranked by peak height of the PSD curves for the representative frequency of the bins. In one embodiment, the set of bins whose representative frequencies have the highest PSD peaks are automatically selected to be the basis of the acoustic fingerprint. In one embodiment, the top N bins are selected. N component time series signals for inclusion in the acoustic fingerprint will be sampled from these top N bins. In this way, the processor may autonomously extract and rank the most salient acoustic time-series signals from a database of measurements spanning a wide band of acoustic frequencies.

In one embodiment, N is 20. In one embodiment, N is between 1 and 20, inclusive. While N may be greater than 20, there are diminishing returns of device identification accuracy for increases in the number of component signals N in an acoustic fingerprint and associated increases in compute costs. In one embodiment, a value of approximately 20 for a number N of component signals in acoustic fingerprints strikes a good balance between identification accuracy and compute cost, with identification accuracy exceeding 95%. In one embodiment, the number of bins and resulting component signals may be adjusted to other values depending on the frequency ranges supported by the acoustic transducer and associated amplifier and processing hardware.

As used herein, the term "time series signal" refers to a data structure in which a series of data points (such as observations or sampled values) are indexed in time order. Representative frequencies for the set of N bins are sampled at intervals over a period of time to produce a set of component time series signals to be components of an acoustic fingerprint. Where the device is the target device, the target acoustic fingerprint is generated from the set of component time series signals. Where the device is the reference device, the reference acoustic fingerprint is generated from the set of component time series signals. In one embodiment, the sampling interval is modest, for example, an interval of one second. Experiments have demonstrated selecting N to be 20 bins and reporting their-frequency dependent power metrics at a modest interval such as 1 second results in good identification performance at a modest compute cost.

In one embodiment, an acoustic fingerprint includes a set of N time series signals of values sampled at intervals derived from the N selected salient frequencies. These time series signals may be referred to as component signals of the acoustic fingerprint. In one embodiment, there are N component signals in the acoustic fingerprint, each of which is sampled from a different one of the selected bins (that is, sampled from the representative frequency of the bin). For example, in one embodiment, an acoustic fingerprint is a data structure that includes the N component signals. At this point, the acoustic fingerprint has been generated, and may be used for comparisons.

Thus, in one embodiment, the reference acoustic fingerprint includes N component signals, and target acoustic fingerprint acoustic fingerprint includes N component signals. Thus, in one embodiment, the reference acoustic fingerprint and the target acoustic fingerprint have an equal number of component signals. In one embodiment, these signals correspond to each other. This correspondence is based on the sampled frequency for the component time series signal. For example, a first reference signal of the N component signals of the reference acoustic fingerprint is sampled from the reference acoustic output at a first frequency, and a first target signal of the N component signals of the target acoustic fingerprint is sampled from the target acoustic output also at the first frequency.

In one embodiment, the reference acoustic fingerprint (provided for generation of the similarity metric) is generated from measurements of acoustic output of the reference device. For example, the reference acoustic fingerprint may be created from live acoustic output data, for example, prior to or concurrently with detection of acoustic output of the target device and creation of the target fingerprint. In one embodiment, the reference device is of unknown configuration. A created reference acoustic fingerprint may be stored in a library or database of acoustic fingerprints for subsequent retrieval or use.

In one embodiment, a user may be presented with an option to select whether the acoustic fingerprinting system is to generate a reference fingerprint or generate a target fingerprint, and in response to input selecting one option or the other, the acoustic fingerprinting system will execute the user-selected option.

In some situations, it is possible that the component time series signals contain superimposed ambient noise. Therefore, in one embodiment, after the creation of the component time series signals by sampling the selected most salient bins, the acoustic fingerprinting system may perform an ambient compensation technique. The ambient compensation technique detects and corrects for superimposed ambient noise. In one embodiment, a first portion of the values of each component time series signal are designated a training portion. The first portions are then used to train a multivariate machine learning algorithm (such as the multivariate state estimation technique) to predict the values of the component time series signals. A second portion of the values of each component time series signal are designated a surveillance portion. The trained multivariate ML algorithm consumes the surveillance portions of the component time series and predicts their values. In one embodiment, the predicted values for the component time series are recorded as a de-noised component time series. In one embodiment, one or more of the de-noised component time series are included in the acoustic fingerprint in place of the original component time series. This makes the acoustic fingerprinting technique more robust in high-noise areas (such as ports or harbors). The ambient compensation further reduces the chance of false-positive or false negative identifications by the acoustic fingerprinting system. In this way, the acoustic fingerprinting system may compensate for ambient noise in the component time series signals based on values for the component time series signals predicted by a machine learning algorithm.

—Example Similarity and Matching of Target and Reference Devices—

As mentioned above, the processor generates a similarity metric that quantifies similarity of the target acoustic fingerprint to a reference acoustic fingerprint. In one embodiment, the acoustic fingerprinting system 100 is configured to conduct a comparison test between acoustic fingerprints of devices in order to generate the similarity metric.

In one embodiment, the acoustic fingerprinting system utilizes the acoustic fingerprints output from the acoustic fingerprint generation component 105 to conduct a comparison test between acoustic operation signatures of devices. In one example procedure for the comparison, initially, one device is chosen as the reference device or "Golden System" (GS), and another device is chosen as the target device or "Unit Under Test" (UUT). The acoustic operation signatures of these devices are represented by their respective acoustic fingerprints. The acoustic fingerprint of the reference device (or reference acoustic fingerprint) is compared to the acoustic fingerprint of the target device (or target acoustic fingerprint).

In one embodiment, to compare the reference device to the target device, the acoustic fingerprinting system calculates the Mean Absolute Error (MAE) in a sequential one to one fashion. In one embodiment, the first component signal in the reference acoustic fingerprint is compared to the first component signal in the target acoustic fingerprint, and the second component signal in the reference acoustic fingerprint is compared to the second component signal in the target acoustic fingerprint, and so on through the correlated pairs of component signals. The resulting MAE values are then summed to distil the differences between the two signatures into a similarity metric called the Cumulative MAE (CMAE). In one embodiment, this process is repeated for any remaining target devices.

On a macro scale this process may assist in quantitatively differentiating between different models of devices allowing for a passive identification of an exact device under question. To accomplish this one device (e.g., a boat) under surveillance would be chosen as the reference device and the remaining devices in a group (e.g., boats in a fleet) would be chosen as reference devices and compared to that reference device. The CMAEs for identical devices will be drop to zero while devices of different make and model will have large values and therefore indicate a difference in make and model. The CMAE similarity metric may therefore be used to, for a target device, identify the make/model of the target device from a library of acoustic fingerprints stored for multiple makes/models of boats.

As discussed above, in one embodiment, an acoustic fingerprint includes a set of N component time series signals (TSS) of values sampled at intervals from selected salient frequencies. In one embodiment, the component TSSs of acoustic fingerprints allow for comparison of one acoustic fingerprint to another in the time domain. For example, by comparing values of a component TSS in the acoustic fingerprint to values of a corresponding component TSS in another acoustic fingerprint, similarity (or difference) between the component TSSs may be quantified. This process of comparison to quantify similarity between corresponding TSSs in acoustic fingerprints may be repeated for remaining or additional corresponding pairs of component TSSs to quantify overall similarity between the acoustic fingerprints.

In one embodiment, the processor compares the values of component time series signals in the target acoustic fingerprint (also referred to herein as a target component TSS) with the values of corresponding component time series signals in the reference acoustic fingerprint (also referred to herein as a reference component TSS). In one embodiment, the reference acoustic fingerprint has reference component TSSs for a similar (or same) set of frequency bins as does the target acoustic fingerprint. Thus, in one embodiment, a target component TSS corresponds to a reference component TSS where they are both sampled from the similar bins.

In one embodiment, values of the target component TSS are compared pairwise with the values of the corresponding reference component TSS. In one embodiment, an initial pair of values are selected, one value from the target component TSS and one from the reference component TSS. In one embodiment, the pair of values selected are the values occupying beginning (or end) positions of the target component TSS and reference component TSS. In one embodiment, other locations in the component TSS signals may be selected for comparison.

In one embodiment, the initial values are then compared to find an extent to which the values differ. For example, the values may be compared by finding an absolute value of the difference or residual between them. This absolute value of the difference may also be referred to as an absolute error between the paired values. Additional pairs of values from the target and reference component TSSs are subsequently compared to find an absolute value of the difference between the pair. In one embodiment, each pair of values following the initial values of the component TSSs are compared in turn to find an absolute error between each pair. In one embodiment, a subset of the pairs of values of the component TSS are compared to find an absolute error between each pair in the subset. For example, some pairs may be skipped, for example by comparing only value pairs appearing at an interval in the component TSSs.

In one embodiment, the processor calculates a mean of the absolute errors between the paired value of the corresponding target and reference component TSS to generate a mean absolute error (MAE) for these corresponding component TSSs. In one embodiment, the processor calculates a MAE between each corresponding pair of target and reference component TSSs of the target and reference acoustic fingerprints. Then, in one embodiment, the processor calculates a cumulative MAE (CMAE) between the target and reference acoustic fingerprints from the set of the MAEs between the component signals. In one embodiment, the processor calculates the CMAE by combining the MAEs, for example by adding up all the MAEs to find the sum of the MAEs. In one embodiment, the CMAE between the target and reference acoustic fingerprints is used as a similarity metric to quantify the similarity or likeness of the target and reference acoustic fingerprints.

In one embodiment, other similarity metrics may be substituted for the CMAE. In one embodiment, other similarity metrics that quantify similarity in the time domain of the corresponding component TSSs for target and reference acoustic fingerprints may be acceptable alternative similarity metrics to CMAE. For example, similarity metrics between target and reference acoustic fingerprints based on mean absolute scaled error, mean squared error, or root mean square error between the corresponding target and reference component TSSs may also perform acceptably.

In one embodiment, finding a match between target and reference acoustic fingerprints indicates that the target device is of a same type as the reference device. For example, the target device may be of the same type as the reference device where the target device has the same make and model as the reference device. The target device being the same type as the reference device does not necessarily mean that the target device is the identical unit as the reference device.

Note that stochastic differences between devices of the same make and model is enough to uniquely identify the device. Thus, in one embodiment, finding a match between target and reference acoustic fingerprints indicates that the target device is the reference device. In other words, the target device and reference device are a match when they are the same device.

—Passive Acoustic Surveillance—

In one embodiment, the acoustic output of the target device is recorded passively, for example by one or more acoustic transducers. For example, in one embodiment, acoustic energy is not directed to the target device by the acoustic fingerprinting system. Instead, energy collected from the target device is generated by operation of the target device (such as motor or engine noise) or generated by interaction of the target device with its surroundings (such as sounds of a boat hull on water or tire noise on a road).

Advantageously, the passive nature of acoustic surveillance minimizes risk of the surveillance being detected. For example, passive recording of acoustic output does not alert operators of a target vehicle to the surveillance. This is in contrast to active surveillance activities such as RADAR, LIDAR, or SONAR, which respectively direct radio, laser, or sound energy towards the target vehicle. These active surveillance activities may be detected by operators of the target device, who may then abort any illicit activity.

—Example Acoustic Transducers—

As used herein, an acoustic transducer refers to an apparatus that converts sound wave vibrations into electrical signals when exposed to the sound wave vibrations. For example, an acoustic transducer may be a microphone, hydrophone, or geophone as discussed in further detail herein. The electrical energy generated by the transducer from the sound wave vibrations may be amplified by an amplifier and/or recorded as a data structure in various media.

In one embodiment, the acoustic fingerprinting system includes one or more acoustic transducers for sensing or recording acoustic output of a device. In one embodiment, acoustic output of the target device is recorded using one or more acoustic transducers. In one embodiment, acoustic output of the reference device is recorded using one or more acoustic transducers. Differences between a set of acoustic transducers used to record acoustic output of a target device and a set of transducers used to record acoustic output of a reference device may be corrected for by the acoustic fingerprinting system.

In one embodiment, the acoustic transducer may be a spherically isotropic transducer that receives sound wave vibrations from multiple directions. In one embodiment, the acoustic transducer may be a directional transducer that collimates incoming sound wave vibrations from a particular direction to the transducer through a shaped channel (such as through a round or rectangular tube). In one embodiment, the particular direction is a direction toward a target device or reference device. In one embodiment, the acoustic transducer may be a directional transducer that concentrates incoming sound wave vibrations from a particular direction to the transducer by reflecting the sound wave vibrations off of a reflecting inner surface such (such as off a parabolic surface or partial spherical surface). The concentrating directional transducer concentrates soundwaves impinging on a larger opening where the sound waves come in approximately parallel from a target source. In one embodiment, a directional transducer serves to exclude ambient noise from the sensed acoustic output of a target device. Transducers with varying sensitivity based on direction may also be used.

In one embodiment, the acoustic fingerprinting system uses a plurality of (or multiple) transducers. For example, the plurality of transducers are independent directional microphones. The plurality of transducers is deployed with at least several inches of separation between the transducers. In one embodiment, the plurality of transducers includes two concentrating directional microphones. Employing two or more microphones deployed with several or more inches of separation permits continuous triangulation. The triangulation allows the system to estimate with fairly high accuracy the location of a vehicle under surveillance. This allows for more precise labeling of samples as belonging to a particular vehicle under surveillance. The triangulation also allows the system to infer a rate at which a vehicle is coming closer or going away. This allows for compensation for Doppler shifts in frequency in the acoustic output received by the system.

In one embodiment, the acoustic fingerprinting system uses just one transducer. Where just one transducer is used, the acoustic fingerprinting system compensates for Doppler shifts in frequency by sending a pulsed signal and inferring bounce-back time.

In one embodiment, an acoustic transducer may be an electromagnetic-acoustic transducer, such as a condenser transducer, a dynamic transducer, or a ribbon transducer. In a capacitance or condenser transducer, a diaphragm acts as one plate of a capacitor, in which the electrical signals are produced as electrical energy across the capacitor plates is changed when the sound wave vibrations displace the diaphragm. In a dynamic or moving-coil transducer, an induction coil is placed in a magnetic field, and the electrical signals are produced by induction as the induction coil is displaced within the magnetic field by the action of the sound wave vibrations (for example by action on a diaphragm attached to the induction coil). In a ribbon transducer, a conductive ribbon is suspended in a magnetic field, and the electrical signals are produced by induction as the ribbon is displaced within the magnetic field by the action of the sound wave vibrations.

In one example, the acoustic transducer may be a piezoelectric-acoustic transducer that generates electrical energy in proportion to the sound wave vibrations when a piezoelectric material is deformed by the sound wave vibrations. In one example, the acoustic transducer may be an optical-acoustic transducer that converts sound wave vibrations into electrical energy by sensing changes in light intensity, such as in a fiber-optic or laser microphone. Other acoustic transducers for generating electrical signals from sound wave vibrations may also be used in accordance with the acoustic fingerprinting systems and methods described herein.

—Acoustic Fingerprint Library—

In one embodiment, the reference acoustic fingerprint is retrieved from a library (or other data structure(s)) of acoustic fingerprints. The reference acoustic fingerprint is stored in the library in association with information describing the reference device. In one embodiment, a library of acoustic fingerprints is maintained by one or more parties (including third parties), such as government entities or device manufacturers. For example, a government entity may acoustically surveil one or more vehicles of a given make and model, and generate (and add to the library) an acoustic fingerprint for those vehicles. These surveillance acoustic fingerprints may serve as reference fingerprints for the make and model of the surveilled device, as well as a unique fingerprint of the surveilled device. Or, for example, where the device is a vehicle, legitimate vehicle manufacturers will generate and supply to the library acoustic fingerprints for various makes and models of the manufacturer's vehicles.

Association between information in the library may include computer-readable relationship or connection between the acoustic fingerprint data and the data describing the reference device, for example, sharing a row in a table, referencing keys of other tables, linking between data values, or other affiliation of data. In one embodiment, the information describing the reference device may include values that describe type, make, model, configuration, or other physical properties of the device. The information describing the reference device may include operation parameters of the reference device during collection of acoustic output to generate the reference fingerprint, such as throttle position or speed. The information describing the reference device may include location of the reference device during collection of acoustic output to generate the reference fingerprint, for example by GPS coordinate, latitude and longitude, address, or other geolocation information. The information describing the reference device may include a unique identifier of the device, such as a serial number, vehicle identification number, vehicle registration number, or other descriptor of a specific device or unit.

—Example Application of Acoustic Fingerprinting—

As mentioned above, acoustic fingerprinting for acoustic identification of devices finds one application in vehicle surveillance and interdiction. For example, the acoustic fingerprinting systems and methods may be used to track and identify boats or other vehicles involved in illegal cargo distribution. While example embodiments may be described herein with respect to such vehicle surveillance and interdiction, the acoustic fingerprinting systems and methods described herein may be used to identify a broad range of devices.

In one embodiment, the acoustic fingerprinting systems and methods described herein identify or match vehicles. In one embodiment, the acoustic fingerprinting systems and methods identify a make and model of vehicle. In one embodiment, the acoustic fingerprinting systems and methods not only identify a make and model of a vehicle, but additionally uniquely identify the exact vehicle.

In one embodiment, the target device is a vehicle. As used herein, a vehicle is a self-propelled device for transporting persons or things. A vehicle may be, for example, a watercraft for transporting persons or things on or in water, such as a boat, ship, submarine, submersible, personal watercraft or jet-ski, or hovercraft. A vehicle may also be, for example, an aircraft for transporting persons or things by air, such as an airplane, helicopter, multi-copter (for example a quad-copter), autogyro or gyrocopter, ultralight, blimp, dirigible, or semi-rigid airship. A vehicle may also be, for example, a land craft for transporting persons or things over land, such as an automobile, a truck, a locomotive or train, a tank or other armored vehicle. In one embodiment, the target device is a watercraft or an aircraft. In one embodiment, vehicles may be piloted or controlled by an operator on board the vehicle. In one embodiment, vehicles may be remotely operated or remote controlled by an operator away from the vehicle, such as in a drone aircraft. Vehicles may be autonomous or self-driving, where the operator is computer logic. Vehicles may be non-autonomous, where the operator is a person.

In one embodiment, the acoustic fingerprinting systems and methods described herein may be used for passive surveillance of boats or other watercraft. Surveillance equipment such as acoustic transducers may be placed on shore for surveillance of watercraft in a harbor or port, or otherwise near a coastline. Surveillance equipment such as acoustic transducers may be placed on ships or otherwise in or on the water for surveillance of watercraft at sea or offshore.

In one embodiment, groups of acoustic transducers deployed across stretches of coastline and/or areas of water may be interconnected in order to provide multiple points of surveillance of watercraft. The interconnection may be by data networks between computing devices that collect acoustic information from the acoustic transducers. This allows watercraft to be tracked as they move through a region.

In one embodiment, where an acoustic fingerprint for a target device is not in the library of acoustic fingerprints, for example during an initial surveillance or monitoring of the target device, the acoustic fingerprint for the target device may be stored in the library as a reference acoustic fingerprint. In one use case, where a target fingerprint of a boat is not in the library of known acoustic fingerprints for known makes, models, or individual devices, the acoustic fingerprint is stored as a reference and used to positively identify the vessel when interdiction craft are able to stop the vessel.

Figure 4:
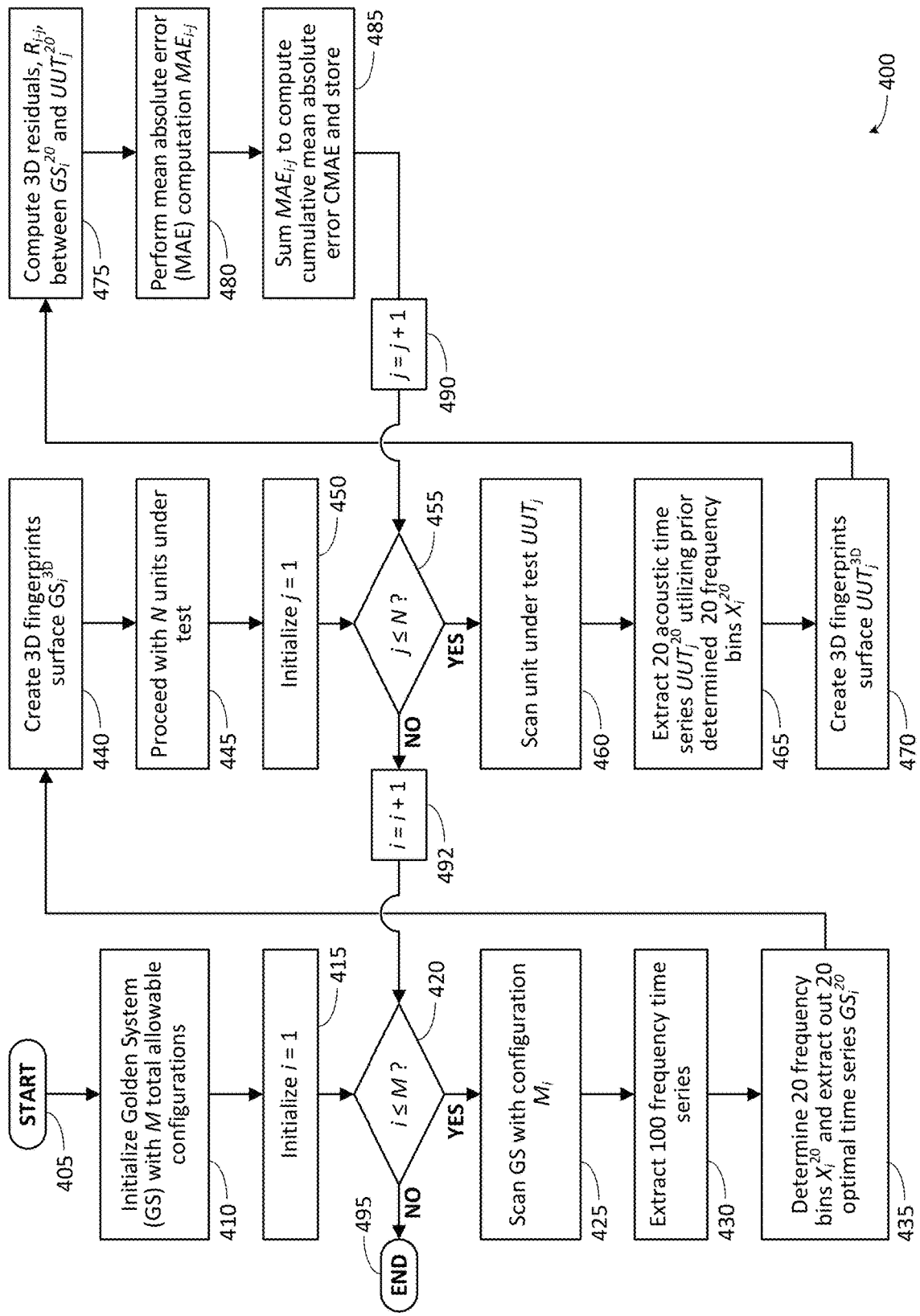
FIG. 4 illustrates one embodiment of an acoustic fingerprinting method associated with acoustic identification of a target device.

FIG. 4 illustrates one embodiment of an acoustic fingerprinting method 400 associated with acoustic identification of a target device. In one embodiment, method 400 is one example of a CMAE-based comparison algorithm for differentiating devices. At a high level, a reference acoustic fingerprint is generated from acoustic output of a reference device for one or more configurations of the reference device, and then one or more target acoustic fingerprints are generated from acoustic output of reference device(s) and compared with the reference acoustic fingerprint(s).

In one embodiment, acoustic fingerprinting method 400 initiates at start block 405 in response to a processor (such as a processor of acoustic fingerprinting system 100) determining one or more of: (i) a computer configured as or as part of an acoustic fingerprinting system (such as system 100) has received or has begun receiving acoustic output of a reference device; (ii) acoustic surveillance of a reference device has commenced or has completed; (iii) a user (or administrator) of an acoustic fingerprinting system (such as system 100) has initiated method 400; or (iv) that method 400 should commence in response to occurrence of some other condition. Method 400 continues to process block 410.

At process block 410, the processor initializes the reference device (also referred to as a golden system or GS) with a set of M total allowable configurations. In one embodiment, the allowable configurations of the reference device include manufacturer variations of a particular make and model of device. For example, where the device is a boat, allowable configurations may include different motors, such as a 4-cylinder engine configuration, a 6-cylinder engine configuration, an 8-cylinder engine configuration, etc., with further variation for example based on fuel type such a diesel engine configurations and gasoline engine configurations. In one embodiment, the allowable configurations include those variations that affect operating noise, such as drivetrain options, and may exclude those variations that do not affect operating noise, such as paint color. In one embodiment, therefore, M may be a number of known variations in configuration of a make and model of reference device.

At process block 415, the processor initiates a counter i for an outer loop that repeats for each of the M configurations. The outer loop is headed by decision block 420. At decision block 420, the processor determines whether the counter i is less than or equal to the number of configurations M. Where this condition is true (decision block 420:YES), the outer loop proceeds through an iteration, continuing at process block 425.

At process block 425, the processor scans the reference device (GS) that has been placed in a configuration $M_i$. In one embodiment, the measurements of the acoustic output of the reference device in the particular configuration are taken, for example as described in detail above. Processing then continues to process block 430.

At process block 430, the processor extracts one hundred (100) frequency time series from the measurements of the acoustic output of the reference device (GS) in configuration $M_i$, for example as described in detail above. In one embodiment, the acoustic measurements are thus converted to a coarse set of bins (in this case, 100 bins). Processing then continues to process block 435.

At process block 435, the processor determines twenty (20) frequency bins $X_i^{20}$ and extracts out 20 time series $GS_i^{20}$ for the reference device (GS) in configuration $M_i$, for example as described in detail above. In one embodiment, a smaller subset (in this case, 20 bins) of the frequencies are identified to be most salient, that is, the frequencies that are most useful and pertinent to inform about the make, model, type, or identity of the reference device. In one embodiment, time series signals are extracted from the 20 bins that were identified as most salient, for example by sampling them at intervals, as described above. These time series signals will be used as component signals of acoustic fingerprints for the reference device (GS) in configuration $M_i$. Processing then continues to process block 440.

At process block 440, the processor creates a three-dimensional fingerprints surface $GS_i^{3D}$ for the reference device (GS) in configuration $M_i$. In one embodiment, the acoustic fingerprint for the reference device (GS) in configuration $M_i$ is created from the component signals selected at process block 435. In one embodiment, the acoustic fingerprint for the reference device (GS) in configuration $M_i$ is created as a three-dimensional surface in dimensions of frequency, time, and acoustic power amplitude. In one embodiment, the three-dimensional fingerprint surface $GS_i^{3D}$ combines the component signals, with the amplitude of each component signal extending over the range of its bin on the frequency axis. Processing then continues to process block 445.

At process block 445, the processor proceeds with a number N of target devices (also referred to as units under test (UUT)). In one embodiment, the number of target devices (UUTs) is counted. Processing then continues to process block 450, where the processor initiates a counter j for an inner loop that repeats for each of the N target devices (UUTs). The inner loop is headed by decision block 455. At decision block 455, the processor determines whether the counter j is less than or equal to the number of target devices (UUTs) N. Where this condition is true (decision block 455:YES), the inner loop proceeds through an iteration, continuing at process block 460.

In the inner loop, the measurements of acoustic output are repeated for one or more target systems. The component time series signals are sampled from the acoustic output of the target system at the same frequency bins determined for the reference system. This enables comparison of target and reference component TSSs one-to-one, at the same frequencies. With this one-to-one comparison between the selected frequencies, it becomes clear whether there is or is not a difference between a target component TSS and the reference component TSS.

At process block 460, the processor scans the target device $UUT_j$. In one embodiments, the measurements of the acoustic output of target device $UUT_j$ are taken, for example as described in detail above. Processing then continues to process block 465.

At process block 465, the processor extracts twenty (20) acoustic time series $UUT_j^{20}$ utilizing the prior-determined twenty frequency bins $X_i^{20}$ from the acoustic output of the target device $UUT_j$. The prior determined bins $X_i^{20}$ are those bins or ranges of frequency determined or selected when the reference device (GS) in configuration $M_i$ was scanned. In one embodiment, the processor extracts the component TSS ($UUT_j^{20}$) for the twenty bins by sampling the representative frequencies of these bins at intervals, for example as described in detail above. Thus, in one embodiment, the bins $X_i^{20}$ are sampled from the acoustic output of the reference device to generate component signals for the reference device fingerprint (for example as described above with reference to process block 435), and then the bins $X_i^{20}$ are sampled again from acoustic output of the target device to generate component signals for the target device fingerprint. Processing then continues to process block 470.

At process block 470, the processor creates a three-dimensional fingerprints surface $UUT_j^{3D}$ for the target device $UUT_j$. In one embodiment, the acoustic fingerprint for the target device is created from the component signals extracted at process block 465. When plotted together in dimensions of frequency, time, and acoustic power amplitude, the component signals of the acoustic fingerprint for the target device $UUT_j$ form a three-dimensional fingerprints surface $UUT_j^{3D}$. Processing then continues to process block 475.

At process block 475, the processor computes three-dimensional residuals $R_{i-j}$ between component time series signals $GS_i^{20}$ for the reference acoustic fingerprint and component time series signals $UUT_j^{20}$ for the target acoustic fingerprint. In one embodiment, the processor compares the corresponding time series signals to find the difference or residuals between the corresponding pairs of target and reference component signals, for example as described in detail above. When the computing of residuals is repeated for each pair of target and reference component signals, the three-dimensional residuals $R_{i-j}$ are computed between $UUT_j^{3D}$ and $GS_i^{3D}$. Processing then continues to process block 480.

At process block 480, the processor performs a mean absolute error (MAE) computation to produce mean absolute errors $MAE_{i-j}$ on the three-dimensional residuals $R_{i-j}$. In one embodiment, the MAE values between the corresponding reference and target component time series signals for each frequency are determined, for example as described in detail above. In this example, where there are 20 frequencies, the processor finds the MAE value between the corresponding component time series signals for each of those bins, resulting in 20 MAE values $MAE_{i-j}$. Processing then continues to process block 485.

At process block 485, the processor sums the mean absolute errors $MAE_{i-j}$ to compute the cumulative mean absolute error (CMAE), and stores the CMAE for subsequent use. In one embodiment, the CMAE is used as a similarity metric to determine whether or not target device $UUT_j$ is a match to reference device GS in configuration $M_i$, for example as described in further detail above. Processing then continues to process block 490.

At process block 490, counter j for the inner loop is incremented j=j+1, and processing returns to decision block 455 to determine whether or not the inner loop is to be repeated for another iteration, for another target device. In response to the determination at decision block 455 that the inner loop is not to be repeated for another iteration (decision block 455: NO), processing continues to process block 492, where counter i for the outer loop is incremented i=i+1. Processing then returns to decision block 420 to determine whether or not the outer loop is to be repeated for another iteration, for another configuration of the reference device. In response to the determination at decision block 420 that the outer loop is not to be repeated for another iteration (decision block 420: NO), processing continues to END block 495, where method 400 completes.

At the conclusion of method 400, CMAE similarity metrics have been created for each comparison of the M configurations of the reference device with the N target devices. These similarity metrics may be compared to a threshold, as described in detail above to determine whether any of the N target devices match any of the M configurations of the reference device.

—Multiple Device Identification—

In one embodiment, the target device is one among a plurality of devices. In one embodiment, each of the plurality of devices may be acoustically surveilled as additional target devices with one or more acoustic transducers. Thus, in one embodiment, the processor may passively record acoustic output of the plurality of devices including the target device using the one or more acoustic transducers. The processor may then identify the target device from among the plurality of devices. The identification may be based on comparison of the acoustic fingerprint of the target device with acoustic fingerprints of the other devices.

In one embodiment, the acoustic output for devices in the plurality of devices is cross-compared with the acoustic output of other devices in the plurality of devices by similarity metric in order to differentiate the devices. In one embodiment, the devices are differentiated by type (such as by make and model). In one embodiment, the devices are differentiated by identity.

Figure 5:
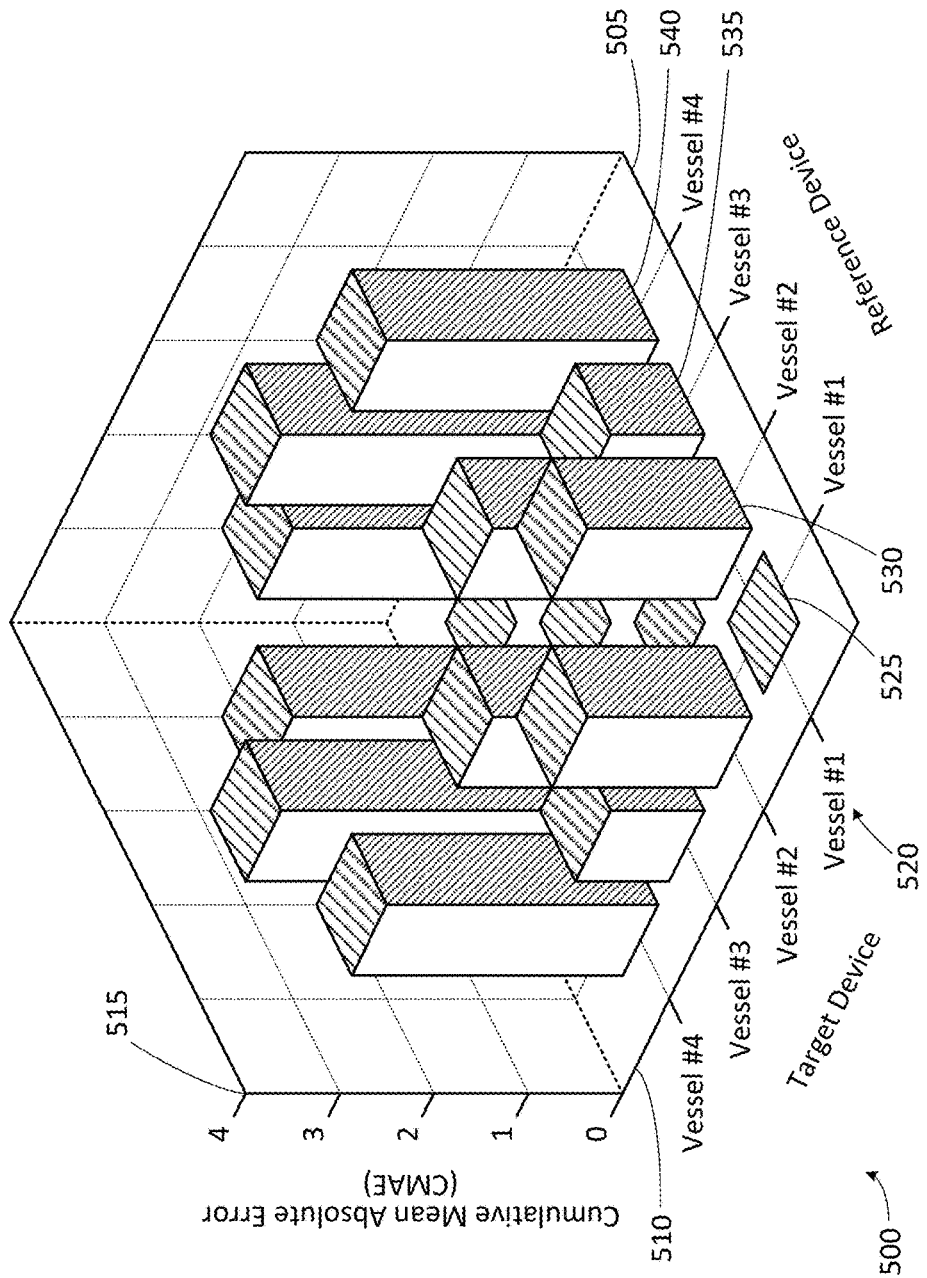
FIG. 5 illustrates an example three-dimensional bar plot of the similarity metric value between different devices.

FIG. 5 illustrates an example three-dimensional bar plot 500 of the similarity metric value between different devices. While the plot 500 is shown and described with respect to an example use case of acoustically differentiating boats under surveillance by make and model, the procedures for acoustic differentiation may be more generally applied to acoustically differentiating a plurality of devices.

In one embodiment, plot 500 shows the CMAE similarity metric values between each member of a set of four vessels under surveillance plotted against three axes: a reference device axis, x-axis 505, a target device axis, y-axis 510, and a CMAE similarity metric axis, z-axis 515. The CMAE value between an acoustic fingerprint of a reference device and an acoustic fingerprint of a target device is plotted as a bar at the intersection of the reference device and the target device in the x-y plane of plot 500.

In one embodiment, plot 500 illustrates output from the acoustic fingerprint identification process as applied to multiple devices, as applied in an example use case of differentiating makes and models of boats under acoustic surveillance. In one embodiment, the output from the acoustic fingerprint identification process may be presented in a graphical user interface that displays a bar plot of CMAE similarity metrics between reference and target devices, such as plot 500.

In one embodiment, acoustic output has been collected for each of four unique vessels of differing make and model. Reference and target acoustic fingerprints have been generated for each device, for example as shown and described above with reference to FIGS. 2 and 4. In one embodiment, both the reference and target acoustic fingerprints for a device are calculated from the same acoustic output measurements. CMAE similarity metric values between the four metrics between the four devices have been calculated, stored, and retrieved for display in plot 500. In one embodiment, the CMAE similarity metrics are normalized to correct for differences in acoustic energy or loudness of the measurements acoustic output from the devices.

The first row 520 indicates the CMAE similarity metric values of vessel #1 as it is leaving port compared to itself, vessel #1 525, and to the three remaining boats under surveillance: vessel #2 530, vessel #3 535, and vessel #4 540. The first CMAE similarity metric value for vessel #1 525 is zero, because the measurements from vessel #1 are compared to itself. Comparing vessel #1 to other makes and models, the CMAE similarity metric is much higher. For example, as seen at reference 530, the CMAE similarity metric value for comparing vessel #1 with vessel #2 is approximately 2.0 dB. The higher similarity metric value than occurs with the self-comparison indicates that the vessels are not identical. This provides evidence that any further surveillance can be confidently tracked to a unique boat. In one embodiment, this process is repeated with all combinations of boats under surveillance, as seen in the remaining target device rows of plot 500.

—Selected Advantages—

In one embodiment, the acoustic fingerprinting systems and methods described herein can identify an exact make/model of a device such as a vehicle. In one embodiment, the acoustic fingerprinting systems and methods described herein can identify an exact individual device. For example, in an interdiction use case, where ten identical make/model boats are being watched in a port, and only boat #3 does something raising suspicion, then even if all ten boats randomize their positions/locations the next day, the acoustic fingerprinting systems and methods described herein can identify exactly boat #3. In one embodiment, the acoustic fingerprint identification is so accurate that it can prove in precise forensic detail which of a set of devices is connected to an acoustic fingerprint. Thus, for example, the acoustic fingerprint can be used by government organizations to positively identify devices that were used in the performance of a suspicious or illicit activity while under passive surveillance.

In one embodiment, the acoustic fingerprints are compact representations of the operational acoustic output (e.g., motor/engine noise) of a device. The compact size of the acoustic fingerprint enables or enhances real-time identification of target devices. In one embodiment, the acoustic fingerprinting systems and methods transforming an original acoustic wave form-which has a high sampling rate (for example 20 kilohertz) that is too large to import into cloud systems due to bandwidth considerations-into a cluster of time series signals at a lower sampling rate. This substantial reduction in size enables importation into a cloud environment along with other telemetry variables, and due to the form of transformation, there is little if any loss in accuracy of identification when using the acoustic fingerprint as shown and described herein.

These and other advantages are enabled by the acoustic fingerprinting systems, methods, and other embodiments described herein.

—Cloud or Enterprise Embodiments—

In one embodiment, the acoustic fingerprinting system 100 is a computing/data processing system including an application or collection of distributed applications for enterprise organizations. The applications and computing system 100 may be configured to operate with or be implemented as a cloud-based networking system, an infrastructure-as-a-service (IAAS), platform-as-a-service (PAAS), or software-as-a-service (SAAS) architecture, or other type of networked computing solution. In one embodiment the acoustic fingerprinting system is a centralized server-side application that provides at least the functions disclosed herein and that is accessed by many users via computing devices/terminals communicating with the computing system 100 (functioning as the server) over a computer network.

In one embodiment, one or more of the components described herein may in intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/Internet protocol (TCP/IP) or other computer networking protocol. In one embodiment, components may (i) generate or compose an electronic message or signal to issue a command or request to another component, (ii) transmit the message or signal to other components, and (iii) parse the content of an electronic message or signal received to identify commands or requests that the component can perform, and in response to identifying the command, the component will automatically perform the command or request.

In one embodiment, one or more of the components described herein are configured as program modules stored in a non-transitory computer readable medium. The program modules are configured with stored instructions that when executed by at least a processor cause the computing device to perform the corresponding function(s) as described herein.

—Computing Device Embodiment—

Figure 6:
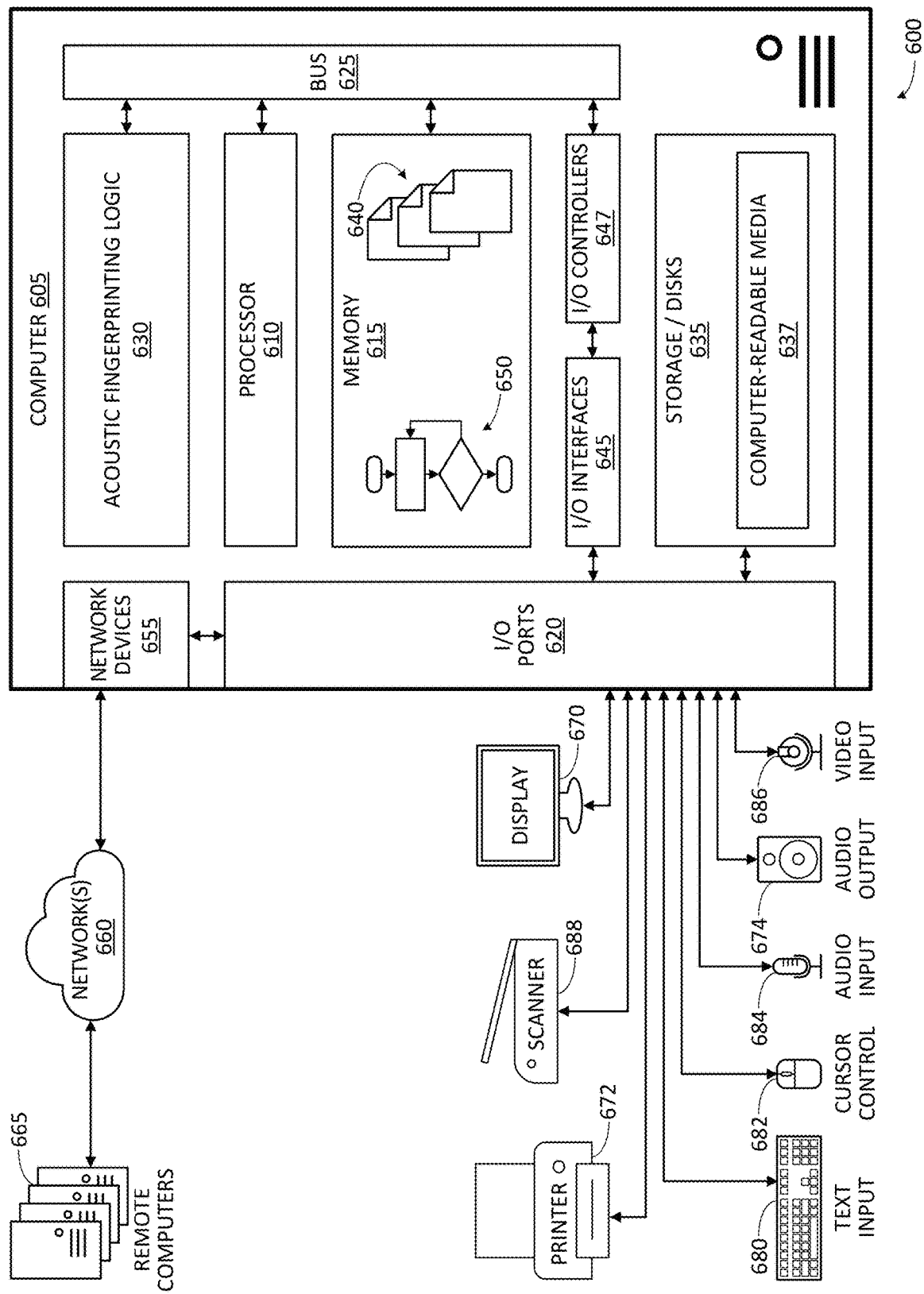
FIG. 6 illustrates an embodiment of a computing system configured with the example systems and/or methods disclosed.

FIG. 6 illustrates an example computing device 600 that is configured and/or programmed as a special purpose computing device with one or more of the example systems and methods described herein, and/or equivalents. The example computing device may be a computer 605 that includes at least one hardware processor 610, a memory 615, and input/output ports 620 operably connected by a bus 625. In one example, the computer 605 may include acoustic fingerprinting logic 630 configured to facilitate acoustic fingerprint identification of devices, similar to logic, systems, and methods shown and described herein for example with reference to FIGS. 1-5.

In different examples, the logic 630 may be implemented in hardware, a non-transitory computer-readable medium 637 with stored instructions, firmware, and/or combinations thereof. While the logic 630 is illustrated as a hardware component attached to the bus 625, it is to be appreciated that in other embodiments, the logic 630 could be implemented in the processor 610, stored in memory 615, or stored in disk 635.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate acoustic fingerprint identification of devices. The means may also be implemented as stored computer executable instructions that are presented to computer 605 as data 640 that are temporarily stored in memory 615 and then executed by processor 610.

Logic 630 may also provide means (e.g., hardware, non-transitory computer-readable medium that stores executable instructions, firmware) for performing acoustic fingerprint identification of devices.

Generally describing an example configuration of the computer 605, the processor 610 may be a variety of various processors including dual microprocessor and other multi-processor or multi-core architectures. A memory 615 may include volatile memory and/or non-volatile memory. Non-volatile memory may include, for example, ROM, PROM, and so on. Volatile memory may include, for example, RAM, SRAM, DRAM, and so on.

A storage disk 635 may be operably connected to the computer 605 via, for example, an input/output (I/O) interface (e.g., card, device) 645 and an input/output port 620 that are controlled by at least an input/output (I/O) controller 647. The disk 635 may be, for example, a magnetic disk drive, a solid-state disk drive, a floppy disk drive, a tape drive, a Zip drive, a flash memory card, a memory stick, and so on. Furthermore, the disk 635 may be a CD-ROM drive, a CD-R drive, a CD-RW drive, a DVD ROM, and so on. The memory 615 can store a process 650 and/or data 640, for example. The disk 635 and/or the memory 615 can store an operating system that controls and allocates resources of the computer 605.

In one embodiment, non-transitory computer-readable medium 637 includes computer-executable instructions such as software. In general computer-executable instructions are designed to be executed by one or more processors 610 accessing memory 615 or other components of computer 605. These computer-executable instructions may include, for example, computer-executable code and source code that may be compiled into computer-executable code or interpreted for execution.

The computer 605 may interact with, control, and/or be controlled by input/output (I/O) devices via the input/output (I/O) controller 647, the I/O interfaces 645, and the input/output ports 620. Input/output devices may include, for example, one or more displays 670, printers 672 (such as inkjet, laser, or 3D printers), audio output devices 674 (such as speakers or headphones), text input devices 680 (such as keyboards), cursor control devices 682 for pointing and selection inputs (such as mice, trackballs, touch screens, joysticks, pointing sticks, electronic styluses, electronic pen tablets), audio input devices 684 (such as acoustic transducers as described in detail above, or external audio players), video input devices 686 (such as video and still cameras, or external video players), image scanners 688, video cards (not shown), disks 635, network devices 655, and so on. The input/output ports 620 may include, for example, serial ports, parallel ports, and USB ports.

The computer 605 can operate in a network environment and thus may be connected to the network devices 655 via the I/O interfaces 645, and/or the I/O ports 620. Through the network devices 655, the computer 605 may interact with a network 660. Through the network, the computer 605 may be logically connected to remote computers 665. Networks with which the computer 605 may interact include, but are not limited to, a LAN, a WAN, and other networks.

In one embodiment, computer 605 may be configured with hardware to process heavy workloads (such as those involved in acoustic fingerprinting from fine-frequency acoustic output) at high speed with high reliability, for example by having high processing throughput and/or large memory or storage capacity. In one embodiment, computer 605 is configured to execute cloud-scale applications locally where network access is limited.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method, comprising:
   generating a target acoustic fingerprint from acoustic output of a target device, wherein the target acoustic fingerprint includes a set of component time series signals sampled from a set of frequencies that have highest power spectral density peaks among frequencies of reference acoustic output of a reference device;
   generating a similarity metric that quantifies similarity of the target acoustic fingerprint to a reference acoustic fingerprint of the reference device, wherein the similarity metric is a cumulative mean absolute error between the component time series signals of the target acoustic fingerprint and corresponding component time series signals of the reference acoustic fingerprint;
   comparing the similarity metric to a threshold; and
   in response to the similarity metric satisfying the threshold, indicating that the target device matches the reference device.

2. The method of claim 1, further comprising:
   in response to satisfying the threshold, indicating that the target device is the reference device.

3. The method of claim 1, further comprising:
   in response to satisfying the threshold, indicating that the target device is a same type of device as the reference device.

4. The method of claim 1, further comprising:
   measuring acoustic output of a device;
   decomposing a spectrum of the measurements into a set of frequencies;
   partitioning the set of the frequencies into bins covering ranges of the set of the frequencies;
   selecting a set of one or more of the bins that contain the highest power spectral density peaks to be a basis of an acoustic fingerprint; and
   sampling representative frequencies of the set of bins at intervals over a period of time to produce the set of component time series signals;
   wherein (i) where the device is the target device, the target acoustic fingerprint is generated from the set of the component time series signals, and (ii) where the device is the reference device, the reference acoustic fingerprint is generated from the set of the component time series signals.

5. The method of claim 1, wherein the generating the similarity metric further comprises:
   for a set of one or more target component signals included in the target acoustic fingerprint, determining a mean absolute error between the target component signal and a corresponding reference component signal of the reference acoustic fingerprint; and
   summing the mean absolute errors to generate the cumulative mean absolute error.

6. The method of claim 1, further comprising generating the reference acoustic fingerprint from measurements of acoustic output of the reference device.

7. The method of claim 1, further comprising retrieving the reference acoustic fingerprint from a library of acoustic fingerprints, wherein the reference acoustic fingerprint is stored in the library in association with information describing the reference device.

8. The method of claim 1, further comprising passively recording the acoustic output of the target device with a plurality of directional acoustic transducers, wherein the directional acoustic transducers are deployed with sufficient distance between the directional acoustic transducers to permit triangulation of a location of the target device.

9. The method of claim 1, further comprising:
   passively recording acoustic output of the target device with one or more acoustic transducers; and
   compensating for Doppler shift in the acoustic output.

10. The method of claim 1, further comprising:
    training a machine learning algorithm to predict values of the target acoustic fingerprint using a training portion of the acoustic output;
    compensating for ambient noise in the target acoustic fingerprint by substituting values of a plurality of the component time series signals with predictions of the values by the trained machine learning algorithm; and
    wherein the machine learning algorithm is a multivariate machine learning algorithm.

11. The method of claim 1, wherein the target device is one of a watercraft or an aircraft.

12. A non-transitory computer-readable medium storing computer-executable instructions that when executed by at least a processor of a computer cause the computer to:
    generate a target acoustic fingerprint from target acoustic output of a target device, wherein the target acoustic fingerprint includes a set of component time series signals sampled from a set of frequencies that have highest power spectral density peaks among frequencies of reference acoustic output of a reference device;

compensate for ambient noise in the component time series signals based on values for the component time series signals predicted by a machine learning algorithm;

generate a similarity metric that quantifies similarity of the target acoustic fingerprint to a reference acoustic fingerprint of the reference device, wherein the similarity metric is a cumulative mean absolute error between the component time series signals of the target acoustic fingerprint and corresponding component time series signals of the reference acoustic fingerprint;

comparing the similarity metric to a threshold;

in response to a first comparison result of the comparing the similarity metric to the threshold, indicating that the target device matches the reference device; and in response to a second comparison result of the comparing the similarity metric to the threshold, indicating that the target device does not match the reference device.

13. The non-transitory computer-readable medium of claim 12, wherein the instructions further cause the computer to:

in response to the first comparison result, indicate that the target device is the reference device; and in response to the second comparison result, indicate that the target device is not the reference device.

14. The non-transitory computer-readable medium of claim 12, wherein the instructions further cause the computer to:

in response to the first comparison result, indicate that the target device is a same type of device as the reference device; and in response to the second comparison result, indicate that the target device is a different type of device than the reference device.

15. The non-transitory computer-readable medium of claim 12, wherein the instructions to generate a target acoustic fingerprint from target acoustic output of the target device further cause the computer to:

decompose a spectrum of measurements of the reference acoustic output of the reference device into a set of frequencies;

partition the set of frequencies into bins covering ranges of the frequencies;

select representative frequencies for a plurality of the bins that have the highest power spectral density peaks to be included in the set of frequencies for the target acoustic fingerprint; and sample the representative frequencies of the plurality of bins from the target acoustic output of the target device at intervals over a period of time to produce the set of component time series signals.

16. The non-transitory computer-readable medium of claim 12, wherein the instructions for generation of the similarity metric further cause the computer to:

for a set of one or more reference component signals included in the target acoustic fingerprint, determine a mean absolute error between the reference component signal and a corresponding component signal of the reference acoustic fingerprint; and sum the mean absolute errors to generate the cumulative mean absolute error.

17. A computing system, comprising:

a processor; and a memory operably connected to the processor;

a non-transitory computer-readable medium operably connected to the processor and memory and storing computer-executable instructions that when executed by at least the processor cause the computing system to:

generate a target acoustic fingerprint from measurements of acoustic output of a target device, wherein the target acoustic fingerprint includes a plurality of component time series signals sampled from a set of frequencies that have highest power spectral density peaks among frequencies of reference acoustic output of a reference device;

compensate for ambient noise in the target acoustic fingerprint by substituting values of the component time series signals with machine learning predictions of the values;

generate a similarity metric that quantifies similarity of the target acoustic fingerprint to a reference acoustic fingerprint of a reference device, wherein the similarity metric is a cumulative mean absolute error between the component time series signals of the target acoustic fingerprint and corresponding component time series signals of the reference acoustic fingerprint;

compare the similarity metric to a threshold;

in response to a first comparison result of the comparing the similarity metric to the threshold, indicating that the target device matches the reference device; and in response to a second comparison result of the comparing the similarity metric to the threshold, indicating that the target device does not match the reference device.

18. The computing system of claim 17, wherein the instructions further cause the computing system to:

in response to the first comparison result, indicate that the target device is the reference device; and in response to the second comparison result, indicate that the target device is not the reference device.

19. The computing system of claim 17, further comprising one or more acoustic transducers, wherein the instructions further cause the computing system to passively record the acoustic output of the target device with the one or more acoustic transducers to generate the measurements of the acoustic output.

20. The computing system of claim 17, further comprising one or more acoustic transducers, wherein the instructions further cause the computing system to:

passively record acoustic outputs of a plurality of target devices including the target device with the one or more acoustic transducers at a first time and at a second time after a change of position; and cross-compare the acoustic outputs from the first time and the second time to identify the target device from among the plurality of target devices.

* * * * *

UNITED STATES PATENT AND TRADEMARK OFFICE
CERTIFICATE OF CORRECTION

| | | |
|---|---|---|
| PATENT NO. | : 12,158,548 B2 | Page 1 of 1 |
| APPLICATION NO. | : 17/735245 | |
| DATED | : December 3, 2024 | |
| INVENTOR(S) | : Gerdes et al. | |

It is certified that error appears in the above-identified patent and that said Letters Patent is hereby corrected as shown below:

On the Title Page

Column 2, under item [56] Other Publications, Line 3, delete "Processing,." and insert -- Processing, --, therefor.

On page 2, Column 2, under item [56] Other Publications, Line 10, delete "Amsterdan," and insert -- Amsterdam, --, therefor.

On page 3, Column 2, under item [56] Other Publications, Line 7, delete "et al,." and insert -- et al., --, therefor.

In the Claims

In Column 30, Line 4, in Claim 17, after "processor;" delete "and".

In Column 30, Line 5, in Claim 17, after "processor;" insert -- and --.

Signed and Sealed this
Thirteenth Day of May, 2025

Coke Morgan Stewart
*Acting Director of the United States Patent and Trademark Office*